(12) United States Patent
Singh et al.

(10) Patent No.: US 7,647,422 B2
(45) Date of Patent: Jan. 12, 2010

(54) VPN FAILURE RECOVERY

(75) Inventors: Inderpreet Singh, Waltham, MA (US); Benjamin McCann, Acton, MA (US)

(73) Assignee: Enterasys Networks, Inc., Andover, MA (US)

( * ) Notice: Subject to any disclaimer, the term of this patent is extended or adjusted under 35 U.S.C. 154(b) by 980 days.

(21) Appl. No.: 10/222,531

(22) Filed: Aug. 16, 2002

(65) Prior Publication Data

US 2003/0088698 A1    May 8, 2003

Related U.S. Application Data

(60) Provisional application No. 60/332,839, filed on Nov. 6, 2001.

(51) Int. Cl.
G06F 15/173 (2006.01)
H04L 12/28 (2006.01)
H04L 12/56 (2006.01)

(52) U.S. Cl. .................. 709/238; 709/239; 370/351; 370/401

(58) Field of Classification Search ............ None
See application file for complete search history.

(56) References Cited

U.S. PATENT DOCUMENTS

| | | |
|---|---|---|
| 4,627,052 A | 12/1986 | Hoare et al. |
| 4,734,907 A | 3/1988 | Turner |
| 4,823,338 A | 4/1989 | Chan et al. |
| 4,939,726 A | 7/1990 | Flammer et al. |
| 5,076,688 A | 12/1991 | Bowen et al. |
| 5,090,025 A | 2/1992 | Marshall et al. |
| 5,095,480 A | 3/1992 | Fenner |
| 5,132,926 A | 7/1992 | MacEachern et al. |
| 5,136,580 A | 8/1992 | Videlock et al. |
| 5,173,933 A | 12/1992 | Garner et al. |
| 5,243,652 A | 9/1993 | Teare et al. |
| 5,289,460 A | 2/1994 | Drake, Jr. et al. |
| 5,331,637 A | 7/1994 | Francis et al. |
| 5,355,371 A | 10/1994 | Auerbach et al. |
| 5,355,375 A | 10/1994 | Christensen |
| 5,361,256 A | 11/1994 | Doeringer et al. |
| 5,367,667 A | 11/1994 | Wahlquist |
| 5,394,402 A | 2/1995 | Ross |
| 5,396,493 A | 3/1995 | Sugiyama |

(Continued)

FOREIGN PATENT DOCUMENTS

EP    1154624    11/2001

(Continued)

OTHER PUBLICATIONS

Cisco 7100 Series VPN Router, Cisco Systems, Inc.

(Continued)

Primary Examiner—Patrice Winder
Assistant Examiner—Azizul Choudhury
(74) Attorney, Agent, or Firm—Holland & Knight LLP; Brian J. Colandreo, Esq.

(57) ABSTRACT

An approach to rapid failover of a communication path between computers that are linked by redundant virtual links in a virtual private network (VPN) features detection of communication link and device failures through an active monitoring approach and re-routing of communication through a redundant link of the VPN when a failure is detected.

30 Claims, 9 Drawing Sheets

U.S. PATENT DOCUMENTS

| | | | |
|---|---|---|---|
| 5,400,326 A | 3/1995 | Smith |
| 5,428,615 A | 6/1995 | Backes et al. |
| 5,434,855 A | 7/1995 | Perlman et al. |
| 5,442,633 A | 8/1995 | Perkins et al. |
| 5,444,702 A | 8/1995 | Burnett et al. |
| 5,448,565 A | 9/1995 | Chang et al. |
| 5,475,781 A | 12/1995 | Chang et al. |
| 5,481,540 A | 1/1996 | Huang |
| 5,485,455 A | 1/1996 | Dobbins et al. |
| 5,491,694 A | 2/1996 | Oliver et al. |
| 5,500,860 A | 3/1996 | Perlman et al. |
| 5,506,838 A | 4/1996 | Flanagan |
| 5,511,168 A | 4/1996 | Perlman et al. |
| 5,517,494 A | 5/1996 | Green |
| 5,517,620 A | 5/1996 | Hashimoto et al. |
| 5,519,760 A | 5/1996 | Borkowski et al. |
| 5,521,910 A | 5/1996 | Matthews |
| 5,530,703 A | 6/1996 | Liu et al. |
| 5,550,816 A | 8/1996 | Hardwick et al. |
| 5,553,083 A | 9/1996 | Miller |
| 5,583,861 A | 12/1996 | Holden |
| 5,606,602 A | 2/1997 | Coyle et al. |
| 5,608,726 A | 3/1997 | Virgile |
| 5,613,069 A | 3/1997 | Walker |
| 5,621,793 A | 4/1997 | Bednarek et al. |
| 5,634,011 A | 5/1997 | Auerbach et al. |
| 5,640,452 A | 6/1997 | Murphy |
| 5,659,617 A | 8/1997 | Fischer |
| 5,675,582 A | 10/1997 | Hummel et al. |
| 5,684,800 A | 11/1997 | Dobbins et al. |
| 5,727,057 A | 3/1998 | Emery et al. |
| 5,734,865 A | 3/1998 | Yu |
| 5,740,171 A | 4/1998 | Mazzola et al. |
| 5,742,604 A | 4/1998 | Edsall et al. |
| 5,745,685 A | 4/1998 | Kirchner et al. |
| 5,752,003 A | 5/1998 | Hart |
| 5,754,657 A | 5/1998 | Schipper et al. |
| 5,757,916 A | 5/1998 | MacDoran et al. |
| 5,781,726 A | 7/1998 | Pereira |
| 5,781,737 A | 7/1998 | Schmidt |
| 5,790,074 A | 8/1998 | Rangedahl et al. |
| 5,812,819 A | 9/1998 | Rodwin |
| 5,825,772 A | 10/1998 | Dobbins et al. |
| 5,862,338 A | 1/1999 | Walker et al. |
| 5,874,964 A | 2/1999 | Gille |
| 5,881,236 A | 3/1999 | Dickey |
| 5,892,451 A | 4/1999 | May et al. |
| 5,892,910 A | 4/1999 | Safadi |
| 5,892,912 A | 4/1999 | Suzuki et al. |
| 5,898,686 A | 4/1999 | Virgile |
| 5,905,779 A | 5/1999 | Steinmetz |
| 5,920,699 A | 7/1999 | Bare |
| 5,922,073 A | 7/1999 | Shimada |
| 5,963,556 A | 10/1999 | Varghese et al. |
| 5,983,364 A | 11/1999 | Botcosh |
| 5,999,126 A | 12/1999 | Ito |
| 6,005,864 A | 12/1999 | Krause |
| 6,006,259 A | 12/1999 | Adelman et al. |
| 6,012,088 A | 1/2000 | Li et al. |
| 6,018,771 A | 1/2000 | Hayden |
| 6,035,105 A | 3/2000 | McCloghrie et al. |
| 6,041,166 A | 3/2000 | Hart et al. |
| 6,044,400 A | 3/2000 | Golan et al. |
| 6,061,797 A | 5/2000 | Jade et al. |
| 6,070,079 A | 5/2000 | Kuwahara |
| 6,076,114 A | 6/2000 | Wesley |
| 6,078,957 A | 6/2000 | Adelman et al. |
| 6,085,243 A | 7/2000 | Fletcher et al. |
| 6,094,434 A | 7/2000 | Kotzur et al. |
| 6,105,027 A * | 8/2000 | Schneider et al. ............... 707/9 |
| 6,105,064 A | 8/2000 | Davis et al. |
| 6,108,365 A | 8/2000 | Rubin et al. |
| 6,115,754 A | 9/2000 | Landgren |
| 6,122,664 A | 9/2000 | Boukobza et al. |
| 6,130,890 A | 10/2000 | Leinwand et al. |
| 6,131,120 A | 10/2000 | Reid |
| 6,151,324 A | 11/2000 | Belser et al. |
| 6,151,631 A | 11/2000 | Ansell et al. |
| 6,157,647 A | 12/2000 | Husak |
| 6,167,275 A | 12/2000 | Oros et al. |
| 6,167,513 A | 12/2000 | Inoue et al. |
| 6,192,045 B1 | 2/2001 | Williams |
| 6,192,403 B1 | 2/2001 | Jong et al. |
| 6,201,789 B1 | 3/2001 | Witkowski et al. |
| 6,205,126 B1 | 3/2001 | Moon |
| 6,212,391 B1 | 4/2001 | Saleh et al. |
| 6,216,159 B1 | 4/2001 | Chintakrindi et al. |
| 6,222,840 B1 | 4/2001 | Walker et al. |
| 6,230,018 B1 | 5/2001 | Watters et al. |
| 6,233,242 B1 | 5/2001 | Mayer et al. |
| 6,236,365 B1 | 5/2001 | LeBlanc et al. |
| 6,256,338 B1 | 7/2001 | Jalloul et al. |
| 6,259,404 B1 | 7/2001 | Parl et al. |
| 6,273,622 B1 | 8/2001 | Ben-David |
| 6,286,044 B1 | 9/2001 | Aoyama et al. |
| 6,304,218 B1 | 10/2001 | Sugiura et al. |
| 6,308,273 B1 | 10/2001 | Goertzel et al. |
| 6,317,500 B1 | 11/2001 | Murphy |
| 6,327,474 B1 | 12/2001 | Ruutu et al. |
| 6,327,535 B1 | 12/2001 | Evans et al. |
| 6,343,317 B1 | 1/2002 | Glorikian |
| 6,363,422 B1 | 3/2002 | Hunter et al. |
| 6,370,629 B1 | 4/2002 | Hastings et al. |
| 6,388,618 B1 | 5/2002 | Stilp et al. |
| 6,421,009 B2 | 7/2002 | Suprunov |
| 6,442,394 B1 | 8/2002 | Valentine et al. |
| 6,442,616 B1 | 8/2002 | Inoue et al. |
| 6,453,237 B1 | 9/2002 | Fuchs et al. |
| 6,456,853 B1 | 9/2002 | Arnold |
| 6,460,084 B1 | 10/2002 | Van Horne et al. |
| 6,466,786 B1 | 10/2002 | Wallenius |
| 6,480,495 B1 | 11/2002 | Mauger et al. |
| 6,523,064 B1 | 2/2003 | Akatsu et al. |
| 6,539,229 B1 | 3/2003 | Ali |
| 6,542,813 B1 | 4/2003 | Kovacs |
| 6,556,831 B1 | 4/2003 | Buppelmann |
| 6,580,914 B1 | 6/2003 | Smith |
| 6,583,713 B1 | 6/2003 | Bates |
| 6,640,184 B1 | 10/2003 | Rabe |
| 6,640,248 B1 * | 10/2003 | Jorgensen ................... 709/226 |
| 6,665,715 B1 | 12/2003 | Houri |
| 6,701,864 B2 | 3/2004 | Watson et al. |
| 6,716,101 B1 | 4/2004 | Meadows et al. |
| 6,741,863 B1 | 5/2004 | Chiang et al. |
| 6,757,545 B2 | 6/2004 | Nowak et al. |
| 6,757,740 B1 | 6/2004 | Parekh et al. |
| 6,771,639 B1 | 8/2004 | Holden |
| 6,778,818 B1 | 8/2004 | O'Neil |
| 6,795,688 B1 | 9/2004 | Plasson et al. |
| 6,799,049 B1 | 9/2004 | Zellner et al. |
| 6,807,427 B1 | 10/2004 | Sakamoto et al. |
| 6,813,501 B2 | 11/2004 | Kinnunen et al. |
| 6,826,385 B2 | 11/2004 | Kujala |
| 6,826,617 B1 | 11/2004 | Ansell et al. |
| 6,834,195 B2 | 12/2004 | Brandenberg et al. |
| 6,859,791 B1 | 2/2005 | Spagna et al. |
| 6,889,051 B2 | 5/2005 | Ogino et al. |
| 6,889,053 B1 | 5/2005 | Chang et al. |
| 6,920,329 B2 | 7/2005 | Kennedy et al. |
| 6,934,548 B1 | 8/2005 | Gould et al. |
| 6,937,988 B1 | 8/2005 | Hemkumar et al. |
| 6,938,096 B1 | 8/2005 | Greschler et al. |
| 6,983,313 B1 | 1/2006 | Korkea-Aho |
| 6,985,731 B1 | 1/2006 | Johnson et al. |

| | | | |
|---|---|---|---|
| 7,010,583 | B1 | 3/2006 | Aizono et al. |
| 7,089,264 | B1 | 8/2006 | Guido et al. |
| 7,120,449 | B1 | 10/2006 | Muhonen et al. |
| 7,136,915 | B2 | 11/2006 | Rieger, III |
| 7,139,829 | B2 | 11/2006 | Wenzel et al. |
| 7,197,556 | B1 | 3/2007 | Short et al. |
| 7,266,839 | B2 | 9/2007 | Bowers et al. |
| 2001/0022558 | A1 | 9/2001 | Karr, Jr. et al. |
| 2001/0039623 | A1 | 11/2001 | Ishikawa |
| 2002/0010866 | A1* | 1/2002 | McCullough et al. ....... 713/201 |
| 2002/0016831 | A1 | 2/2002 | Peled et al. |
| 2002/0023010 | A1 | 2/2002 | Rittmaster et al. |
| 2002/0034953 | A1 | 3/2002 | Tricarico |
| 2002/0046073 | A1 | 4/2002 | Indseth et al. |
| 2002/0051540 | A1 | 5/2002 | Glick et al. |
| 2002/0052180 | A1 | 5/2002 | Ravishankar et al. |
| 2002/0062379 | A1 | 5/2002 | Widegren et al. |
| 2002/0063656 | A1 | 5/2002 | Gutowski |
| 2002/0107029 | A1 | 8/2002 | Caughran et al. |
| 2002/0122055 | A1 | 9/2002 | Parupudi et al. |
| 2002/0138632 | A1 | 9/2002 | Bade et al. |
| 2002/0164996 | A1 | 11/2002 | Dorenbosch |
| 2002/0188842 | A1 | 12/2002 | Willeby |
| 2003/0035544 | A1 | 2/2003 | Herle et al. |
| 2003/0041167 | A1 | 2/2003 | French et al. |
| 2003/0065571 | A1 | 4/2003 | Dutta |
| 2003/0095509 | A1 | 5/2003 | Ramanan et al. |
| 2003/0185233 | A1* | 10/2003 | Ji et al. ........................ 370/466 |
| 2003/0208523 | A1 | 11/2003 | Gopalan et al. |
| 2004/0064334 | A1 | 4/2004 | Nye |
| 2005/0199792 | A1 | 9/2005 | Argast et al. |

FOREIGN PATENT DOCUMENTS

| | | |
|---|---|---|
| WO | 94/28683 | 12/1994 |
| WO | 97/05749 | 2/1997 |
| WO | 97/41654 | 11/1997 |
| WO | 98/19482 | 5/1998 |
| WO | 00/22862 | 4/2000 |
| WO | 00/44149 | 7/2000 |
| WO | 00/67450 | 11/2000 |
| WO | 00/69198 | 11/2000 |
| WO | 01/08425 | 2/2001 |
| WO | 01/22656 | 3/2001 |
| WO | 01/69956 | 9/2001 |
| WO | 01/76093 | 10/2001 |
| WO | 01/82259 | 11/2001 |
| WO | 01/94967 | 12/2001 |
| WO | 01/95505 | 12/2001 |
| WO | 02/09456 | 1/2002 |
| WO | 02/12914 | 2/2002 |

OTHER PUBLICATIONS

Cisco VPN Routers, Cisco Systems, Inc. (1992-2001).
Cisco VPN Solutions, Cisco Systems, Inc. (2001).
Interior Gateway Routing Protocol, Cisco Systems, Inc. (1999).
IPSec, Cisco Systems, Inc., (1988).
Open Shortest Path First, Internetworking Technology Overview, (1999).
Virtual Router Redundancy Protocol, Network Working Group Request for Comments: 2338.
"802.1 Plenary Meeting Agenda," IEEE 802.1 Meeting, LaJolla, CA, Mar. 11, 1996.
"802.1 Resolution on Progess of VLAN work," Jul. 1995, IEEE.
"802.1Thursday Agenda," IEEE 802.1 Meeting, University of Twente, Enschede, Netherlands, Jul. 11, 1996.
"Attachments Passed by Working Group 802.1," IEEE 802.1, Nov. 1995.
"Cisco IOS VLAN Services," Cisco Systems.
"Clearpoint Demonstrates Frame Relay Support In Interop Frame Relay Solutions Showcase," Clearpoint, Press Release dated Sep. 23, 1991.
"Closing Plenary Minutes," IEEE 802.1 Meeting, LaJolla, CA, Mar. 14, 1996.
"Constellation Product Schedule," Apr. 22, 1992.
"Constellation Series" Clearpoint Research Corporation.
"Cyberlocator: A new Dimension in Network Security," retrieved from www.cyberlocator.com, Jul. 2002.
"DNS LOC: Geo-enabling the Domain System," retrieved from www.ckdhr.com/dns-loc/.
"End Station Tagging Presentation," Presentation Jun. 1996.
"Geographic Location/Privacy (geopriv)" retrieved from www.ietf. org, Jul. 2002.
"Geolocation Service Allows Web Sites to Identify Users' Geographic Locations," Business Geographics, May 2001.
"IEEE 802.1 1995 Document Register," IEEE, 1995.
"IEEE 802.1 Session Notes," IEEE 802.1 Meeting, Jul. 8, 1996 through Jul. 11, 1996.
"IEEE 802.1 Working Group, Minutes of the Mar. 1995 Meeting," West Palm Beach Florida, Mar. 1995.
"IEEE Standards for Local and Metropolitan Area Networks: Media Access Control (MAC) Bridges," IEEE, Technical Committee on Computer Communications of the IEEE Computer Society, Mar. 8, 1991, pp. 1-176.
"IEEE Standards for Local and Metropolitan Area Networks: Overview and Architecture," IEEE, Technical Committee on Computer Communications of the IEEE Computer Society, Dec. 21, 1990, pp. 1-31.
"Instructions to the Editor for P802.1j, and Ballot Summary," Jul. 12, 1995, P802.1-95/008, IEEE.
"Instructions to the Editor for the revision of Overview and Architecture," Jul. 12, 1995, P802.1-95/007, IEEE.
"Internet Protocol," DARPA Internet Program Protocol Specification: RFC 791, Sep. 1981, pp. 1-45.
"IP Multicast Streamlines Delivery of Multicast Applications," The Packet: Cisco Systems Use Magazine, V.7, No. 1, 1995.
"IP Packet Structure".
"ISO/TC211: Geographic Information/Geomatics Location based services possible standards," retrieved from www.isotc211.org/scope/htm.
"LAN Emulation over ATM Version 1.0," The ATM Forum Technical Committee, af-lane-0021.000, Jan. 1995, pp. 1-141.
"Location Pattern Matching & The RadioCamera Network," US Wireless 2001.
"Location Technologies for GSM, GPRS and WCDMA Networks," SnapTrack, White Paper, Nov. 2001.
"Multiprotocol Routing—From Constellation," Clearpoint Research Corporation, 1992.
"New Cisco IOS VLAN Services Make 'Virtual' a Reality," Cisco VLAN Roadmap, Dec. 9, 1996.
"Newbury Networks Debuts First Location-Enabled Networks Solutions for 802.11B WLANS," retrieved from www.newburynetworks.com/newsroom.presslist.php?start=5, Sep. 2001.
"Proposed comments on ISO/IEC 10038/PDAM 2," Jul. 12, 1995, P802.1-95/009, IEEE.
"Proposed Comments on ISO/IEC 15802-5/PDAM 1," Jul. 12, 1995, P802.1-95/010, IEEE.
"Quick VLAN Standardization," IEEE 802.1 Meeting, Ottowa, Oct. 2, 1996.
"Real Time Location Systems and Wireless Local Area Networking: Combining Technologies for Optimum Asset Visibility and Supply Chain Management," Apr. 2001.
"Reliacast to Offer Enhanced Geographic Content Distribution Management Through Partnership with Quova," Mar. 6, 2001.
"Slithernet: A Proposal for Using Moderate-To-High-Speed Synchronous Serial Connections as a LAN-like Networking Medium", Jul. 1991.
"SpotON: Ad-hoc Location Sensing," retrieved from www.portolano.cs.washington.edu/projects/spoton, Jul. 2002.
"TCP-IP Distribution List for Nov. 1991," The Security Digest Archives, Nov. 1991.
"The Richochet Wireless Network Overview," retrieved from http://www.ricochet.net/ricochet/, 1997.
"Virtual LAN Communications," Cisco VLAN Roadmap—White Paper, Dec. 9, 1996.

"Virtual LANs Find a Use for Selective Flooding," Network World, Apr. 10, 1995, V.12, No. 15, p. 54.

"Virtual LANs Get Real," Data Communications, Feb. 1995, pp. 87-96.

"Virtual LANs Near Reality," Data Communications, Jul. 1995, p. 16.

"VisualRoute—Visual Traceroute Utility/Locate Internet Abusers," retrieved from www.visualware.com/visualroute/index/html, Jul. 2002.

Aggarwal, Sudhir, and Raghav, Amritansh, "Dualcast: A Scheme for Reliable Multicasting," IEEE, Apr. 1994, pp. 15-22.

Aguilar, Lorenzo, "Datagram Routing for Internet Multicasting," ACM, 1994, pp. 58-63.

Ahmadi, Hamid, and Denzel, Wolfgang E., "A Survey of Modern High-Performance Switching Techniques," IEEE Journal on Selected Areas in Communications, V.7, No. 7, Sep. 1989, pp. 1091-1103.

Aiello, Rosario, et al., "Casual Ordering in Reliable Group Communications," ACM SIGCOMM, 1993, pp. 106-115.

Almquist, P., and Kastenholz, F., "Towards Requirements for IP Routers," Network Working Group RFC 1716 Memo, Nov. 1994, pp. 1-172.

Alonge, Ken, "Revision to SDE," Email dated Nov. 13, 1995.

Amir and Balakrishnan, "An Evaluation of the Metricom Richochet Wireless Network," U.C. Berkeley, May 1996.

Ammar, Mostafa H., "Probabilistic Multicast: Generalizing the Multicast Paradigm to Improve Scalability," College of Computing, Georgia Institute of Technology, Atlanta, GA, pp. 1-9.

Anderson, Jens Kristian, "Virtual LANs Take Network to Next Level," Computer Technology Review, Sep. 1996, pp. 12-14.

Armstrong, S., et al., "Multicast Transport Protocol," Network Working Group—RFC 1301 Memo, Feb. 1992, pp. 1-36.

Auerbach, Josh, et al., "Multicast Group Membership Management in High Speed Wide Area Networks."

Autolitano, A., et al., "Application of Generalized Parallel Delta Networks to a Hybrid Broadband Switch," IEEE 1989, pp. 123-127.

Axner, David H., "Differing Approaches to Virtual LANs," Business Communications Review, V. 23, No. 12, Dec. 1993, pp. 42-45.

Backes, Floyd, "An Architectural Framework for VLAN Standardization in IEEE 802," IEEE Presentation, Milpitas, CA, Jan. 24, 1996.

Backes, Floyd, "Spanning Tree Bridges; Transparent Bridges for Interconnection of IEEE 802 LANs," IEEE Network, V.2, No. 1, Jan. 1988, pp. 5-9.

Bagwell, Richard T., et al., "A Comparison of Native ATM-Multicast to IP-Multicast With Emphasis on Mapping Between the Two," IEEE, 1995, pp. 189-193.

Bahl and Padmanabhan, "RADAR: An In-Building RF-based User Location and Tracking System," Proc. IEE Infocom 2000, Mar. 2000.

Bahl, Padmanabhan, and Balachandran, "A Software System for Locating Mobile Users: Design, Evaluation, and Lessons," Apr. 2000.

Bahl, Padmanabhan, and Balachandran, "Enhancements to the RADAR User Location and Tracking System," Microsoft Research Technical Report, MSR-TR-2000-12, Feb. 2000.

Balboni, Gian Paolo, et al., "An ATM Switching Testbed," Jul.-Aug. 1991.

Ballardie, Tony, et al., "Multicast-Specific Security Threats and Counter Measures," IEEE 1995, pp. 2-16.

Ballardie, Tony, et al., "Core Based Trees (CBT)—An Architecture for Scalable Inter-Domain Multicast Routing," ACM SIGCOMM, 1993, pp. 85-95.

Bament, Sally, "Why You Should Consider INPs as a Viable Internetworking Solution," Telecommunications, V.27, No. 2, Feb. 1993, pp. 54-57.

Bartlett, John, "Embedded VLAN Tagging," IEEE 802.1 Meeting Presentation, LaJolla, CA, Mar. 12, 1996.

Bartlett, John, "Media or Network Based VLANs?," IEEE 802.1 VLAN Meeting Presentation, LaJolla, CA, Mar. 12, 1996.

Barton and Kindberg, "The Challenges and Opportunities of Integrating the Physical World and Networked Systems," Hewlett Packard Laboratories, HPL-2001-18, Jan. 24, 2001.

Bennett, Geoff, "Routing in the Virtual LAN," Telecommunications, V. 29, No. 7, Jul. 1995, pp. 33, 69-72.

Bernabei, Francisco, et al., "Fully Distributed Routing Control Scheme in an ATM Switch," IEEE, 1990, pp. 766-770.

Bichard, Jean Philippe, "Decouper le Reseau en Segments Autonomes".

Birman, Ken, "A Response to Cheriton's and Skeen's Criticism of Causal and Totally Ordered Communication," Department of Computer Science, Cornell University, Oct. 21, 1993, pp. 11-21.

Birman, Kenneth P., and Joseph, Thomas A., "Reliable Communication in the Presence of Failures," ACM Transactions on Computer Systems, V.5, No. 1, Feb. 1987, pp. 47-76.

Birman, Kenneth, et al., "Design Alternatives for Process Group Membership and Multicast," NTIS, Department of Computer Science—Cornell University, Dec. 1991, pp. 1-31.

Blazevic et al., "Self-Organization in Mobile Ad-Hoc Networks: The Approach of Terminodes," IEEE Comm. Mag. 2001.

Boggs, David Reed, "Internet Broadcasting," Dissertation—Stanford University Graduate Studies, University Microfilms International, Jan. 1982, pp. 1-86.

Bolot, Jean-Chrysostome, et al. "Scalable Feedback Control for Multicast Video Distribution in the Internet," ACM SIGCOMM, 1994, pp. 58-67.

Braden, R., "TCP Extensions for High Performance: An Update," Jun. 21, 1993.

Braden, R., and Postel, J., "RFC 1009—Requirements for Internet Gateways," Jun. 1987, pp. 1-55.

Braden, Robert, "Requirements for Internet Hosts—Communication Layers," Internet Engineering Task Force—RFC 1122, Oct. 1989, pp. 1-115.

Brakmo et al., "Performance Problems in BSD4.4 TCP", Dept. of Computer Science, University of Arizona, Tucson, AZ.

Brakmo et al., "TCP Vegas: End to End Congestion Avoidance on a Global Internet," Dept. of Computer Science, University of Arizona, Tucson, AZ.

Brakmo et al., "TCP Vegas: New Technologies for Congestion Detection and Avoidance," Dept. of Computer Science, University of Arizona, Tucson, AZ, 1996.

Braudes, R., and Zabele, S., "Requirements for Multicast Protocols," Network Working Group RFC 1458 Memo, May 1993, pp. 1-18.

Bulusu, Heidermann and Estrin, "GPS-less Low Cost Outdoor Localization for Very Small Devices," Univ. S. California, Apr. 2000.

Bunn, J.J., "Trip Report: DECworld," unpublished, May 18, 1992, pp. 1-11.

Caffery and Stuber, "Overview of Radiolocation in CDMA Cellular Systems," IEEE Communications Magazine, Apr. 1998, pp. 38-45.

Caffery and Stuber, "Subscriber Location in CDMA Cellular Networks," IEEE Trans Veh. Tech. vol. 47, May 1997.

Casner, Stephen, and Deering, Stephen, "First IETF Internet Audiocast," ACM SIGCOMM—Computer Communication Review, pp. 92-97.

Casner, Steve, "Frequently Asked Questions (FAQ) on the Multicast Backbone (MBONE)," Memo dated Dec. 22, 1994.

Catlin, Jeff, "VLAN," Email dated Nov. 22, 1995.

Challenges for Mesh Networks in UWB Applications, UWB Insider 2004 [retrieved Dec. 1, 2006] from the Internet: <URL: www.uwbinsider.com/technology/print/1_8_mesh_challenges.html>.

Chambers, Alan M. "IP multicast, Floyd Backes's Presentation, Denver," Email dated Nov. 1, 1995.

Chambers, Alan M. "Re: VLAN Ad Hoc Group," Email dated Jun. 14, 1995.

Chambers, Alan, "Mapping the Problem Space," Jul. 9, 1996.

Chan, Cheung-Win, and Yum, Tak-Shing, "An Algorithm for Detecting and Resolving Store-and-Forward Deadlocks in Packet-Switched Networks," IEEE Transactions on Communications, V.Com-35, No. 8, Aug. 1987, pp. 801-807.

Chen and Lin, "Route Optimization and Location Updates for Mobile Hosts," 16th IEEE Int. Conf. on Dist. Comp. Sys., May 1996.

Chen, Helen, et al., "Evaluation of DEC's Gigaswitch for Distributed Parallel Computing," Supersedes-SAND93-8013, Oct. 1993.

Chen, Xing, and Hayes, Jeremiah F., "Access Control in Multicast Packet Switching," IEEE/ACM Transactions on Networking, V.1, No. 6, Dec. 1993, pp. 638-649.

Cheriton, David R. "Virtual LAN Management Protocol (VLMP) Draft RFC," Stanford University and Granite Systems, Inc., Oct. 20, 1995.

Cheriton, David R., and Deering, Stephen E., "Host Groups: A Multicast Extension for Datagram Internetworks," Proceedings Ninth Data Computer Symposium, Sep. 10-13, 1985, pp. 172-179.

Cheriton, David R., and Williamson, Carey L., "VMTP as the Transport Layer for High-Performance Distributed Systems," IEEE Communications Magazine, Jun. 1989, pp. 37-44.

Cheriton, David R., and Zwaenepoel, Willy, "Distributed Process Groups in the V Kernel," ACM Transactions on Computer Systems, V.3, No. 2, May 1985, pp. 77-107.

Cheriton, David R., et al., "Ethernet Group Membership Protocol (EGMP) Draft RFC," Stanford Univeristy and Granite Systems, Oct. 12, 1995.

Cisco VPN Routers, Cisco Systems, Inc. (1992-20001).

Cohen, Jodi, "Critics Take Issue With Fuzzy VLAN Standards Work," Network World, Oct. 30, 1995, V.12, No. 44, pp. 1, 84.

Cohen, Jodi, "Opposing Virtual LAN Views," Network World, Oct. 28, 1996, V.13, No. 44, p. 75.

Cohen, Jodi, "The Truth About Virtual LANs," Network World, Oct. 28, 1996, V.13, No. 44, pp. 1,74.

Cohen, Jodi, "Too Small for VLANs," Network World, Nov. 4, 1996, V.13, No. 45, p. 31.

Conner, Krishnamurthy and Want, "Making Everyday Life Easier Using Dense Sensor Networks," Springer, 2001.

Connery, Glenn, "Re: VLAN Questions/Suggestions," Email dated May 6, 1996.

Corson and Macker, "Mobile As hoc Networking (MANET): Routing Protocal Performance Issues and Evaluation Considerations," Jan. 1999.

Crowcoft, John, "Talking of and to Gateways and Bridges," Email thread.

Cullerot, David, "Requirements for VLANs," 802.1 Interim Meeting, Oct. 1995, Cabletron Systems, Inc.

Cullerot, David, "Virtual LAN Topology," 802.1 Interim Meeting, Oct. 13, 1995, Cabletron Systems, Inc.

Cullerot, David, "VLAN Topology", 802.1 Interim Meeting, Oct. 13, 1995, Cabletron Systems, Inc.

Daviel, Internet Draft entitled, "Geographic Extensions for HTTP transactions," Apr. 2001.

Davis et al., "A Means for Expressing Location Information in the Domain Name System," Jan. 1996.

De Zhong, Wen, et al., "A Copy Network with Shared Buffers for Large-Scale Multicast ATM Switching," IEEE/ACM Transactions on Networking, V.1, No. 2, Apr. 1993, pp. 157-165.

Deering, S., "RFC 1112—Host Extensions for IP Multicasting," Aug. 1989.

Deering, S., and Hinden, R., "RFC 2460—Internet Protocol, Version 6 (IPv6) Specification," RFC Archive, Dec. 1998 pp. 1-40.

Deering, S.E., "Host Extensions for IP Multicasting," Network Working Group—RFC 988 Memo, Jul. 1986, pp. 1-20.

Deering, Stephen E., "Multicast Routing in Internetworks and Extended LANs," SIGCOMM 88 Symposium, Communications, Architectures & Protocols, Stanford, CA, Aug. 16-19, 1988, pp. 55-64.

Deering, Stephen E., and Cheriton, David R., "Multicast Routing in Datagram Internetworks and Extended LANs," ACM Transactions on Computer Systems, V.8, No. 2, May 1990, pp. 85-110.

Deering, Stephen Edward, "Multicast Routing in a Datagram Internetwork," UMI Dissertation Services, Dec. 1991, pp. 1-137.

Deering, Stephen, et al., "An Architecture for Wide-Area Multicast Routing," ACM, Apr. 1994, pp. 126-134.

Deering, Steve, et al., "Efficient Support for Sparse-Group Multicast Routing," Slides from Presentation by Deborah Estrin.

Denning et al. "Location-Based Authentication: Grounding Cyberspace for Better Security," 1996, Elsevier Science Ltd., pp. 1-6.

Derby, et al., "Scoping Multicasts in WAN Interconnected Local Networks," IBM Technical Disclosure Bulletin, Jan. 1992.

Drane, MacNaughton, and Scott, "Positioning GSM Telephones," IEEE Communications Magazine, Apr. 1998.

Duffy, Jim, "Routers' Role Changes as Both Switches, VLANs Come Into Play," Network World, Jun. 3, 1996, V.13, No. 23, p. 22.

Eriksson, Hans, "MBONE: The Multicast Backbone," Communications of the ACM, V.37, No. 8, Aug. 1994, pp. 54-60.

Erramilli, A., and Singh, R.P., "A Reliable and Efficient Multicast Protocol for Broadband Broadcast Networks," ACM, 1988, pp. 343-353.

Estrin, Deborah, and Wei, Liming, "Multicast Routing in Dense and Sparse Modes: Simulation Study of Tradeoffs and Dynamics," IEEE, Jul. 1995, pp. 150-157.

Fall et al., "Comparison of Tahoe, Reno, and Sack TCP," Lawrence Berkeley National Laboratory, Berkeley, CA, Dec. 2, 1995.

Feldmann, et al., "NetScope: Traffic Engineering for IP Networks," IEEE Network Mag. 2000.

Feltman, Charles, "A Reality Check on Virtual LANs," Business Communications Review, V.26, No. 7, Jul. 1996, p. 27.

Finn, Norman W., "External and Internal Addresses in Explicit Tags," Email dated Jan. 25, 1996.

Finn, Norman W., "Implicit vs. Explicit VLAN Frame Tagging," Email dated Jan. 25, 1996.

Finn, Norman W., "Re: 802.1 Interim Meeting—VLANs—Objectives, Contributions, Agenda," Email dated May 17, 1996.

Finn, Norman W., "Re: VLAN Questions/Suggestions," Email dated May 8, 1996.

Finn, Norman W., "Re: VLANs and IP Multicast," Email dated May 9, 1996.

Finn, Norman W., "Slides for External and Internal Addresses in Explicit Tags," Email dated Jan. 25, 1996.

Finn, Norman W., "Slides for Implicit vs. Explicit VLAN Frame Tagging," Email dated Jan. 25, 1996.

Finn, Norman W., "Two Models for VLAN Tagging," Email dated Mar. 8, 1996.

Finn, Norman, "Multiple Spanning Trees in 802.1Q," IEEE 802.1 Presentation, Sep. 26, 1996, pp. 1-11.

Floyd et al., "Increasing TCP's Initial Window," Jul. 1997.

Floyd, S., "Issues of TCP with Sack," Mar. 9, 1996.

Floyd, S., "TCP and Successive Fast Retransmits," Lawrence Berkeley Laboratory, Berkeley, CA May 1995.

Frantz, Paul, "Re: Re: Revision to SDE," Email dated Nov. 24, 1995.

Frantz, Paul, et al., "Proposed VLAN Service Definition," IEEE 802.1 Presentation, Denver, Oct. 13, 1995.

Gabber and Wool, "On Location-Restricted Services," IEEE Network, Nov./Dec. 1999.

Garcia-Molina, Hector, and Spauster, Annemarie, "Ordered and Reliable Multicast Communication," ACM Transactions on Computer Systems, V.9, No. 3, Aug. 1991, pp. 242-271.

Gessler and Jesse, "Advanced Location Modeling to Enable Sophisticated LBS Provisioning in 3G Networks," retrieved from www.teco.edu/locationws/9.pdf, Jul. 2002.

Gong, Li, and Shacham, Nachum, "Elements of Trusted Multicasting," IEEE, Apr. 1994, pp. 23-30.

Gopal, Inder, and Rom, Raphi, "Multicasting to Multiple Groups over Broadcast Channels," IEEE, 1988, pp. 79-81.

Greenfield, David, "A Realistic Approach to Virtual LANs," Data Communications, Feb. 1996, V.25, No. 2, pp. 50, 52.

Hain, T., Internet Drafts entitled "An IPv6 Provider-Independent Global Unicast Address Format," and "Application and Use of the IPv6 Provider Independent Global Unicast Format," Oct. 2001.

Hanks, S., "Generic Routing Encapsulation (GRE)," Oct. 1994.

Harris & Jeffries, Inc., "A Proposal for Software Development—for an IP-Router Facility," Proposal # 910214.01, Feb. 19, 1991.

Harris, B., "Amulet: Approximate Mobile User Location Tracking System," Retrieved from www.winlab.rutgers.edu/~sachin/papers/papers.html, Jul. 2002.

Hart, John and Backes, Floyd, "IEEE 802 Virtual LANs (VLANs), Proposed Definition and Requirements," dated Jul. 10, 1995.

Hart, John, "Re: Re: Revision to SDE," Email dated Nov. 25, 1995.

Hausman, Richard and Ruby, Doug, "Application Requirements for Support of Duplicate Addresses in VLANs," Contribution to IEEE 802.1Q, Vancouver Plenary, Nov. 11, 1996.

Hausman, Richard, "Re: 802.1Q VLAN PAR Backwards Interoperability," Email dated Jun. 24, 1996.

Hawe, Bill, et al., "Transparent Interconnection of Local Area Networks with Bridges," Journal of Telecommunication Networks, V.3, No. 2, pp. 139-152.

Heidemann, J., "Using Geospatial Information in Sensor Networks," USC/Information Sciences Institute, Sep. 17, 2001.

Heywood, Drew, et al., "Enterprise Series Connectivity: Local Area Networks," 1992, pp. 327-353.

Hightower and Borriello, "A Survey and Taxonomy of Location Systems for Ubiquitous Computing," University of Washington Technical Report, UW-CSE 01-08-03, Aug. 24, 2001.

Hightower, Borriello, and Want, "SpotON: An indoor 3D Location Sensing Technology Based on RF Signal Strength," University of Wisconsin CSE Technical Report #2000-02-02, Feb. 18, 2000.

Horowitz, Steve, "Priority Bits & First on the Wire Question," Email dated Jun. 25, 1996.

Horowitz, Steve, "Priority Bits Discussion," Email dated Jun. 7, 1996.

Horowitz, Steve, "VLAN Issues List," Email dated Jun. 7, 1996.

Housley, Russ, "Use of SDE to within VLAN Standard," Email dated Jan. 23, 1996.

Huat, Ong Sion, and Hiong, Goh Seow, "A Generic Multicast-Key Determination Protocol," Defence Science Organization, Singapore. Ideal Congestion Control, Sep. 1997.

Imielinski and Navas, "GPS-Based Addressing and Routing," Nov. 1996.

International Search Report and Written Opinion from PCT/US05/06503.

IP Sec. Cisco Systems, Inc. (1998).

Jacobson, V., "Design Changes to the Kernel Network Architecture for 4.4BSD," Lawrence Berkeley Laboratory, Berkeley, CA May 1992.

Jacobson, V., "Dynamic Congestion Avoidance/Control," email message, Feb. 1988.

Jacobson, V., "End2End," email message, Mar. 1994.

Jacobson, V., "Modified TCP Congestion Avoidance Algorith," email message, Apr. 1990.

Jacobson, V., "Re: Interpacket arrival variance and mean," email message, Jun. 15, 1987.

Jacobson, V., "Re: your congestion scheme," email message, Nov. 1987.

Jacobson, V., "Some Design Issues for High-Speed Networks," Lawrence Berkeley Laboratory, Berkeley, CA Nov. 1993.

Jacobson, V., "TCP Extensions for High Performance," email message, Feb. 1997.

Jacobson, V., "TCP Extensions for Long-Delay Paths," Oct. 1988.

Jeffree, Tony, "Brief Minutes of 802.1—Maui, Jul. 1995," IEEE 802.1 Maui, Jul. 1995.

Jeffree, Tony, "Input paper for July Meeting—Proposed changes to 802.1D Section 3," Email dated Jun. 22, 1995.

Jeffree, Tony, "Proposed Use of GARP for Distribution of VLAN Membership Information," Oct. 28, 1996.

Jeffree, Tony, "Re: Re: Revision to SDE," Email dated Nov. 24, 1995.

Jeffree, Tony, "Re: VLAN Questions/Suggestions," Email dated May 7, 1996.

Jia, Xiaohua, and So, Shirley Y., "A Multicast Mechanism with Ordering on Overlapping Groups," IEEE, 1993, pp. 242-249.

Jing, Hsu Wen, "Multicasting on Certain Self-Similar Networks," Division of Computer Technology—School of Applied Science—Nanyang Technological University, Singapore.

Joe Francica, "Location-based Services: Where Wireless Meets GIS," retrieved from www.geoplace.com, Jul. 2002.

Karagiannis and Heijeck, "Mobile IP: A State of the Art Report," Ericsson Open Report, Jul. 13, 1999.

Keen, Hal, "Comment on P802.1p/D0," Email dated Oct. 30, 1995.

Kindberg and Barton, "The Cooltown User Experience," Hewlett Packard Laboratories, HPL-2001-22, Feb. 2, 2001.

King, Steven S., "It's an Adventure," Network World, Apr. 10, 1995, pp. 49, 54-55.

King, Steven S., "Switched Virtual Networks—Internetworking Moves Beyond Bridges and Routers," Data Communications, Sep. 1994, pp. 66-80.

King, Steven S., "VLANS Raise Delicate Design Issues," Network World, Apr. 17, 1995, V.12, No. 16, pp. 42-43.

King, Steven, "The Many Faces of Virtual LANs," Network World, Mar. 27, 1995, V.12, No. 13, pp. 59-65.

Klamm Keith, "Dancing Bears in Readable Text Format," Email dated Mar. 8, 1996.

Knight, Fred S., "Broadband Future Faces Snarls and Gnarls," Business Communications Review, V. 23, No. 12, Dec. 1993, p. 6.

Kompella, Vachaspathi, et al., "Multicast Routing for Multimedia Communication," IEEE/ACM Transactions on Networking, V.1, No. 3, Jun. 1993, pp. 286-292.

Kompella, Vachaspathi, et al., "Multicasting for Multimedia Applications," Department of Computer Science and Engineering—University of CA, San Diego.

Korkea-Aho and Tang, Internet Drraft (May 2001) entitled "Spactial Location Payload," May 2001.

Langille, Paul, "Partitioning of VLAN Tasks," Email dated Nov. 16, 1995.

Langille, Paul, "Re: Revision to SDE," Email dated Nov. 22, 1995.

Langille, Paul, "Re: . . . Re: Revision to SDE," Email dated Nov. 29, 1995.

Lawson, Stephen, "3Com Unveils a Single Solution for Virtual LANs," InfoWorld, May 13, 1996, V.18, No. 20, p. 59.

Lawson, Stephen, "Cabletron Buys Netlink to Fill Out Frame Relay," InfoWorld, Oct. 7, 1996, V.18, No. 41, p. 51.

Lewis, Bob, "Do VLANs Solve Any Real Problems? Lots of People Seem to Think So," InfoWorld, Jun. 17, 1996, V.18, No. 25, p. 91.

Li et al, "A Scalable Location Service for Geographic Ad Hoc Routing," Proceedings of the ACM MOBICOM 2000 Conference.

Liao, Tseng, and Sheu, "GRID: A Fully Location-Aware Routing Protocol for Mobile As Hoc Networks," Telecommunications Systesm, 2001.

Lidinske, Bill, "802.1 Minutes and Document Plan," Mar. 8, 1995.

Lidinsky, Bill "Re: VLAN Ad Hoc Group," Email dated Jun. 12, 1995.

Lidinsky, Bill, "802.1Q Draft PAR," Email dated Dec. 19, 1995.

Lidinsky, Bill, "8021. Interim Mtg VLAN Agenda," Email dated Oct. 1995.

Lidinsky, Bill "IEEE 802 Overall Agenda—Jul. 1996," Email dated Jun. 23, 1996.

Lidinsky, Bill, "Re: 802.?q," Email dated Jun. 21, 1996.

Lidinsky, Bill, "RE: VLAN use of SDE," Email dated Oct. 2, 1995.

Lidinsky, Bill "VLAN use of SDE," Email dated Oct. 1, 1995.

Lindmeyr, Johann, "VLAN Tagging and Classification," Email dated Nov. 30, 1995.

Lippis, Nick, "Virtual LANs: Real Drawbacks," Data Communications, Dec. 1994, pp. 23-24.

MacLeod, Brian, "1Gbps Ethernet" Email dated Oct. 9, 1995.

Marasli et al., "Partially Reliable Transport Service," Proceedings 2nd IEEE Symp. On Comp. and Comm. (Cat. No. 97TB100137), Proceedings Second IEEE Symposium on Computer and Commmunications, Alexandria, Egypt, Jul. 1-3, 1997, pp. 648-656, XP002131820.

Marasli et al., "Retransmission-Based Partially Reliable Transport Service: An Analytic Model," Proceedings of INFOCOM, US, Los Alamitos, IEEE Comp. Soc. Press, vol. Conf. 15, 1996, pp. 621-629, XP000621327 (ISBN: 0-8186-7293-5).

Markowsky, George, and Moss, Franklin H., "An Evaluation of Local Path ID Swapping in Computer Networks," IEEE Transactions on Communications, V.Com-29, No. 3, Mar. 1981, pp. 329-336.

Martillo, Joachim, "Re: InterOp Debate," Email thread dated Nov. 6, 1991.

Martillo, Joachim, "Using Wide-Area Point-to-Point Links for Computer Networking," Email thread dated Sep. 1, 1991.

Martillo, Yakim, "Re: Ethernet Multicast," Archived Emails.

Mathis et al., "Forward Acknowledgement: Refining TCP Congestion Control," Pittsburgh Supercomputing Center.

Mathis et al., "TCP Rate-Halving with Bounding Parameters," Pittsburgh Supercomputing Center, Oct. 1996.

Mathis et al., "TCP Selective Acknowledgement options," email message, Oct. 1996.

Mauve and Widmer, "A survey on Position-Based Routing in Mobile Ad Hoc Networks," IEEE Network, Nov./Dec. 2001.

Mayer, Erwin, "An Evaluation Framework for Multicast Ordering Protocols," ACM, 1992, pp. 177-187.

McCarthy, Vance, "Fast Ethernet and VLANs," Datamation, Apr. 1, 1996, V.42, No. 7, p. 13.

McConnell, John, "VLANs Are Here to Stay," Network World, Jul. 1, 1996, p. 37.

McGeough, J., "Location-Based Services and Topology," Jul. 26, 2001.

McGeough, J., "Wireless Location Positioning From Existing Signal Level Data," Dec. 12, 2001.

McGibbon, Alex, "Virtual LANs Come of Age," Telecommunications, Jun. 1996, pp. 48-52.

McKeown, Nick, et al., "The Bay Bridge: A High Speed Bridge/Router," Protocols for High-Speed Networks, III (C-9), 1992, pp. 203-218.

McKinley, Philip, and Liu, Jane W.S., "Multicast Routing in Bus-Based Computer Networks," IEEE, 1988, pp. 277-287.

McNealis, Martin, "Re: Revision to SDE," Email dated Nov. 17, 1995.

McNealis, Martin, "Virtual LAN Requirements," Cisco Systems, IEEE 802.1 Interim, Oct. 12, 1995.

Merhar, Milan, "Priority Bits Discussion," Email dated Jun. 7, 1996.

Merhar, Milan, "VLAN Questions/Suggestions," Email dated May 7, 1996.

Merhar, Milan, "VLANs and IP Multicast," Email dated May 9, 1996.

Messier, Fattouche and Peterson, "Locating an IS-95 Mobile Using its Signal," Conf. Rec. The Tenth International Conference on Wireless Communications (Wireless 98). volll, (Calgary, AB, Canada), pp. 562-574.

Meyer, G., "The PPP Encryption Control Protocol (ECP)," Spider Systems, email message, Jun. 1996.

Miller, Ken, "Broadcast News: Multicasting the WAN," Data Communications, V.24, No. 3, Mar. 1995, pp. 25-26.

MMCNEALIS@CISCO.COM, "1995-The year of the Virtual LAN," IEEE Conference Presentation, Maui, Jul. 1995.

Momirov, Milan, "VLANs and IP Multicast," Email dated May 9, 1996.

Moore, Periakaruppan, and Donohoe, "Where in the World is netgeo.caida.org?" Proc. Internet Soc. Con. (INET), 2000.

Moore, Steve, "Virtual LAN Explainer," Computerworld, Jun. 13, 1994, V.28, No. 24, p. 85.

Morency, John and Winkler, Kathrin, "VLANs: Can Layer 3 Save the Day?," Business Communications Review, pp. 47-50.

Moy. John, "MOSPF: Bringing Multicast to Commercial TCP/IP Nets," Network World, V.11, No. 25, Jun. 20, 1994, pp. 11,20.

Moy. John, "Multicast Routing Extensions for OSPF," Communications of the ACM, V.37, No. 8, Aug. 1994, pp. 61-66.

Network Working Group Request for Comments: 1072, "TCP Extensions for long-Delay Paths," Sep. 1997.

Ngoh, L.H., "Multicast Support for Group Communications," Computer Networks and ISDN Systems, 1991, pp. 165-178.

Ngoh, L.H., and Hopkins, T.P., "Transport Protocol Requirements for Distributed Multimedia Information Systems," The Computer Journal, V.32, No. 3, 1989, pp. 252-261.

Niculescu and Nath, "Adhoc Positioning System (APS)," in IEEE GlobeCom, Nov. 2001.

Ofek, Yoram, "Multicast and Semi-FIFO Protocols over Virtual Rings in the MetaNet," IBM T.J. Watson Research Center, Yorktown Heights, NY.

Olsen, Bob, "Up Close: Populating a Virtual LAN," Network World, Oct. 30, 1995, V.12, No. 44, p. 49.

Open Shortest Path First, Inernetworking Technology Overview (1999).

Padmanabhan and Subramanian, "An Investigation of Geographic Mapping Techniques for Internet Hosts," SIGCOMM '01, Aug. 27-31, 2001, San Diego, CA.

Padmanabhan and Subramanian, "Determining the Geographic Locations of Internet Hosts," In Proc. ACM SIGCOMM, Aug. 2001.

Pahlavan and Li, "Indoor Geolocation Science and Technology," IEEE Comminications Magazine, Feb. 2002.

Partridge et al., "A Faster UDP," IEEE/ACM Trans. On Networking, Aug. 1993.

Pasquale, Joseph C., et al., "The Multimedia Multicast Channel," Department of Computer Science and Engineering, University of CA, San Diego.

Passmore, David and Freeman, John, "The Virtual LAN Technology Report", Decisys, Inc., May 1996.

Pattavina, Achille, "Design and Performance Evaluation of a Packet Switch for Broadband Central Offices," INFOCOM Dept., University "La Sapienza", Rome, Italy, 1990, pp. 1252-1259.

Paul Sanjoy, et al., "Multicast Transport Protocols for High Speed Networks," IEEE Apr. 1994, pp. 4-14.

Perlman, Radia, "An Algorithm for Distributed Computation of a Spanning Tree in an Extended LAN," Proceedings—Ninth Data Communications Symposium, Whistler Mountain, British Columbia, Sep. 10-13, 1985.

Perry, Yonadev, "Re: Re: Re: Revision to SDE," Email dated Nov. 27, 1995.

Perry, Yonadev, "Re: Revision to SDE," Email dated Nov. 26, 1995.

Petrosky, Mary, "HUB Shopping Spree" Network World, May 29, 1995.

Polk and Tang, "Spactial Location Server Authentication," Internet Draft (Mar. 2000).

Postel, J. and Reynolds, J., "A Standard for the Transmission of IP Datagrams Over IEEE 802 Networks," Network Working Group—RFC 1042 Memo, Feb. 1988, pp. 1-15.

Priyantha, N., "Providing Precise Indoor Location Information to Mobile Devices," Master's thesis, Massachusetts Institute of Technology, Jan. 2001.

Rajagopalan, Bala, "Reliability and Scaling Issues in Multicast Communication," Computer Communication Review, SIGCOMM 1992 Conference Proceedings, Baltimore, MD, Aug. 17-20, pp. 188-198.

Rand, D., "The PPP Compression Control Protocol (CCP)," Novell, email message, Jun. 1996.

Rijsinghani, Anil, "minutes from day 3 of Interim 802.1 meeting," Email dated Oct. 19, 1995.

Rijsinghani, Anil, "Re: 802.1Q VLAN PAR Backwards Interoperability (802.5/FDDI Coding Issue)," Email dated Jun. 13, 1996.

Rijsinghani, Anil, "Re: VLAN Progress, Tagging, SDE etc.—Just Hold It Please," Email dated Nov. 24, 1995.

Rios, S., "Location Based Services: Interfacing to a Mobile Positioning Center," retrieved from www.wirelessdevnet.com/channels/lbs/features/lbsinterfacing.html, Jun. 2002.

Rivers, Jr, "Re: VLAN Questions/Suggestions," Email dated May 6, 1996.

Rizzo, L., "Issues in the implementation of selective acknoledgements for TCP," email message, Jan. 1996.

Rooney, Sean, et al., "Automatic VLAN Creation Based on On-line Measurement," Computer Communication Review, pp. 50-57.

Salwen, Howard et al., "Examination of the Applicability of Router and Bridging Techniques," IEEE Network, V.2, No. 1, Jan. 1988, pp. 77-80.

Saunders, Stephen, "Building Virtual LANs on a Real-World Budget," Data Communications, Sep. 21, 1995, pp. 39-40.

Saunders, Stephen, "Making Virtual LANs a Virtual Snap," Data Communications, Jan. 1995, pp. 72-74.

Saunders, Stephen, "Matrix-Based Switching Revs Up the LAN," Data Communications, Mar. 21, 1994, pp. 35-36.

Saunders, Stephen, "Switch Puts Virtual LANs on Automatic Pilot," Data Communications, Sep. 1994, pp. 45-46.

Sayed, Ayman, "Re: Revision to SDE," Email dated Nov. 22, 1995.

Seaman, Mark, "For 802.0—Proposed 802.1 PAR," Email dated May 26, 1995.

Seaman, Mark, "Re: IEEE Plenary—VLANs—802.1 Meeting" Email dated Jul. 4, 1995.

Seaman, Mick, "[Mark Sankey/US/3Com: Gigabit Enet and VLAN]," Email dated Apr. 13, 1996.

Seaman, Mick, "802.1 Interim Meeting—VLANs—Objectives, Contributions, Agenda," Email dated May 3, 1996.

Seaman, Mick, "802.1 Interim on VLANs: Discussion of Requirements," Email dated Oct. 25, 1995.

Seaman, Mick, "802.1 VLAN Interim Meeting—Reminder and Initial Agenda," Email dated Jan. 22, 1996.

Seaman, Mick, "VLAN Progress, Tagging, SDE etc.—Just Hold It Please," Email dated Nov. 22, 1995.

Seamen, Mick, "Foil for Discussion, IEEE 802.1 Closing Plenary," IEEE 802.1 Meeting, Jul. 11, 1996.
Seamn, Mick, "802.1 Agenda, Denver Interim Meeting (VLANs, etc.)," Email dated Jul. 28, 1995.
Seifert, Rich, "Re: Type Field Values," Email dated May 29, 1996.
Seifert, William M., "Bridges and Routers," IEEE Network, V. 2, No. 1, Jan. 1988, pp. 57-64.
Seifert, William M., "Bridges and Routers," IEEE Network, V.2, No. 1, Jan. 1988, pp. 57-64.
Sellers, Philip, "Cabletron Gambling on Virtual LANS," Computing Canada, Apr. 25, 1996, V.22, No. 9, p. 27.
Shah, Himanshu, "Re: 802.1Q VLAN PAR Backwards Interoperability (802.5/FDDI Coding Issue)," Email dated Jun. 14, 1996.
Shah, Himanshu, "Re: Re: Revision to SDE," Email.
Sharma et al., "Scalable Timers for Soft State Protocols," Information Sciences Institute, University of Southern California.
Shimada, K. Karl, "VLAN Classes," IEEE 802.1 Interim Meeting Presentation, Denver CO, Oct. 11-13, 1995, Rising Star Research.
Shimada, K. Karl, "VLAN Definition," IEEE 802.1 Interim Meeting Presentation, Denver CO, Oct. 11-13, 1995, Rising Star Research.
Shimada, K. Karl, "VLAN Requirements," IEEE 802.1 Interim Meeting Presentation, Denver CO, Oct. 11-13, 1995, Rising Star Research.
Shimada, Karl K. "802.1 Interim meeting," Email dated Aug. 22, 1995.
Simpson, W., "The Point-to-Point Protocol (PPP)," Daydreamer, Jul. 1994.
Sincoskie, David W., and Cotton, Charles J., "Extended Bridge Algorithms for Large Networks," IEEE Network, V.2, No. 1, Jan. 1988, pp. 16-24.
Slager, "IEEE 802.1 Opening Plenary Minutes," IEEE 802.1 Meeting, University of Twente, Enschede, Netherlands, Jul. 8, 1996.
Slager, R.V., "Email Voting Ballot: P802.1j/D5: Managed Objects for MAC Bridges—Supplement to IEEE Std. 802.1d", IEEE, Aug. 2, 1995.
Slager, Rosemary V., "IEEE 802.1 (unofficial) VLAN Meeting Minutes," IEEE 802.1 Milpitas, CA, Jan. 24, 25, 1996.
Slager, Rosemary, "802.1 Interim Meeting Minutes," 802.1 Interim Meeting, Wakefield, MA, Jun. 1996.
Slager, Rosemary, "IEEE 802.1 Interim Meeting Minutes," IEEE 802.1 Meeting, Ottawa, Canada, Oct. 2, 1996 through Oct. 4, 1996.
Slager, Rosemary, "Jun. 1996 Resolutions," Email dated Jun. 7, 1996.
Slager, Rosemary, "Proposed Minutes," Email dated Jun. 19, 1996.
Slofstra, Martin, "Cisco Unveils Multimedia 'Blueprint'," Computing Canada, V.21, No. 7, Mar. 29, 1995, p. 21.
Small, Smailagic and Siewiorek, "Determining User Location for Contect Aware Computing Through the Use of a Wireless LAN Infrastructure," retrieved from http://www.cs.cmu.edu/laura/docdir/small00.pdf, 2003.
Stallings, William, "2.2 Communication Switching," Local Networks, 2nd Ed., 1987, pp. 32-33, 410-416, Macmillan Publishing Company, New York, NY.
Sterkel, Terrance E, "Re: VLAN Progress, Tagging, SDE etc.—Just Hold It Please," Email dated Nov. 23, 1995.
Stern, T.E., and Jiang, Song, "Multicast—Multihop Networks: Connectivity and Performance," Summary, Department of Electrical Engineering and CTR, Columbia University, pp. 1-8.
Steve <WITZ@CHIPCOM.COM>, "Re: IP Multicast, Floyd Backes's Presentation, Denver," Email dated Nov. 1, 1995.
Steve <WITZ1961@AOL.COM>, "Default VLAN," Email dated May 7, 1996.
Steve <WITZ1961@AOL.COM>, "Loop Issues," Email dated May 9, 1996.
Steve <WITZ1961@AOL.COM>, "VLAN Questions/Suggestions," Email dated May 6, 1996.
Stevens, W., "TCP Slow Start, Congestion Avoidance, Fast Retransmit, and Fast Recovery Algorithms," NOAO, Jan. 1997.
Strigini, Lorenzo, et al., "Multicast Services on High-Speed Interconnected LANs," Proceedings of the IFIP International Workshop on High Speed Local Area Networks, Feb. 1987, pp. 173-176.
Swedberg, G., "Ericsson's mobile location solutions," Ericsson Review No. 4, 1999.

Tang and Polk, "Spatial location BOF (spatial) of IETF," retrieved from www.nrc.nokia.com/ietf-spatial/.
Tang, Polk, Korkea-Aho and Takahashi, Internet Draft (Nov. 2000) entitled "Spatial Location Payload Requirements with Protocol Recommendations".
Tang, Ruuru, and Loughney, Internet Draft (Feb. 14, 2000) entitled "Problems and Requirements of Some IP Applications Based on Spatial Location Information."
Tannenbaum, Todd, and Conover, Joel, "Managing Your Switched Networks," Network Computing, Jun. 15, 1996.
Tasker, Robin, "Re: Revision to SDE," Email dated Nov. 27, 1995.
TCP Selevtive Acknoledgement option (and related changes) for FreeBSD, Sep. 1997.
Thaler, Pat, "Re: Revision to SDE," Email dated Nov. 27, 1995.
Thompson, Geoff, "Re: Re: Re: Revision to SDE," Email dated Nov. 27, 1995.
TrueSystems.com Inc. "HIPAA & Truesccess," 2001, p. 1.
U.S. Appl. No. File Wrapper 07/773,161.
Vielmetti, Edward et al., "Messages for Dec. 1992," Google Groups: comp.dcom.isdn, Message board thread, Dec. 1992.
Virtual Router Redundancy Protocol, Network Working Group Request for Comments: 2338.
Waitzman, D., et al., "Distance Vector Multicast Routing Protocol," Network Working Group—RFC 1075, Nov. 1988, pp. 1-24.
Wakerly, John, "An Efficient Frame-Tagging Format for VLANs," IEEE 802.1 Meeting Presentation, Jan. 24-25, 1996.
Wakerly, John, "FDDI VLAN Frame Format—Two Alternate Interpretations," Email dated Jun. 14, 1996.
Wakerly, John, "Forwarding Methods for VLAN-Tagged Frames in a Bridged LAN," IEEE 802.1 Meeting Presentation, Jan. 24-25, 1996.
Wakerly, John, "Implementation Subgroup Notes," Email dated Oct. 19, 1995, IEEE 802.1 Interim Meeting.
Wakerly, John, "Re: Default VLAN & loops," Email dated May 7, 1996.
Wakerly, John, "Re: Properties of Methods A and B for FDD1 and 802.5 VLAN Frame Format," Email dated Jun. 20, 1996.
Wakerly, John, "Technical Contributions for January Interim Meeting," Email dated Nov. 29, 1995.
Wakerty, John and Cheriton, David R., "Virtual LAN Management Protocol (VLMP)" IEEE 802.1 Meeting, Oct. 11-13, 1995, Alantec.
Wakerty, John, "Some VLAN Styles," IEEE 802.1 Meeting, Oct. 11-13, 1995, Alantec.
Wall, David Wayne, "Mechanisms for Broadcast and Selective Broadcast," Dissertation—Stanford University Graduate Studies, University Microfilms International, Jun. 1980, pp. 1-87.
Walther and Fischer, "LocaPhone—Location-Aware group Communication for Mobile Groups," retrieved from www.isoc.org/isoc/conferences/inet/01/CD_proceedings/T70/walther.pdf, Jul. 2002.
Wang, Peter, et al. "Email Voting Ballots: P802/D21: Overview and Architecture (second edition)," IEEE, Oct. 20, 1995.
Want et al., "The Active Badge Location System," ACM Trans Info. Sys., vol. 10, Jan. 1992.
Ward Jones and Hopper, "A new Location Technique for the Active Office," IEEE Personal Comm. vol. 4, Oct. 1997.
Warwick, Trevor, "Re: Flow control contribution," Email dated Mar. 14, 1995.
Waters, A.G., "Multicast Provision for High Speed Networks," Proceedings of the IFIP TC6/WG6.4 Fourth International Conference on High Speed Performance Networking, Liege, Belgium, Dec. 14-18, 1992, pp. 317-348.
Waters, Gillian A., et al., "The Use of Broadcast Techniques on the Universe Network," ACM, 1984, pp. 52-57.
Werb and Lanzl, "Designing a Positioning System for Finding Things and People Indoors," IEEE Spectrum, Sep. 1998.
Williamson R., "Introduction to Location based Services for Mobile Wireless Users," Approach to Training Situation Awareness, retrieved from www.ecdesignnet.com/papers/location%20Based%20Services%202002.htm, Jul. 2002.
Wright, Michele, "Re: VLAN Questions/Suggestions," Email dated May 6, 1996.
Wright, Michele, "Re[2]: VLAN Questions/Suggestions," Email dated May 7, 1996.

Written Opinion and Search Report from PCT US99/22919, Jan. 30, 2001 (10 pages).

Written Opinion from PCT/US03/06169, Aug. 13, 2005 (5 pages).

Yang, Henry and Rijsinghani, Anil, "Some VLAN Requirements & Considerations," IEEE 802.1 Maui, Jul. 11, 1995.

Zagami and Parl, "Providing a Universal Location Services Using a Wireless E911 Location Network," IEEE Communications Magazine, Apr. 1998.

Zipf, A., "User-Adaptive Maps for Location-Based Services (LBS) for Tourism," Proc. Of Enter Comm. Tech in Tourism, Innsbruck Austria, Springer Computer Science, 2002.

Zwicker, H.R., "Netzwerke—Die Informationstransporter der Moderne," Elektrotechnik, Jun. 1993.

* cited by examiner

VPN FAILURE RECOVERY

CROSS-REFERENCE TO RELATED APPLICATIONS

This application claims the benefit of U.S. Provisional Application No. 60/332,839 filed Nov. 6, 2001, which is incorporated herein by reference.

BACKGROUND

This invention relates to recovery from device and communication link failures in a virtual private network (VPN).

Virtual private networks are used to provide virtual communication links, called "tunnels," between different sites that are coupled by a communication network. Typically, the communication network separating the sites is a public network, such as the Internet, which may not provide secure communication. The tunnels are then established to provide secure communication paths between the sites. One approach to establishing secure tunnels is according to the IPSec standard (see IETF RFCs 2401-2411 and 2451).

Network based services are often configured to have more than one gateway to the public network to provide high availability and communication capacity. For example, a service may have two separate gateways that make use of different communication links to different points-of-presence (POPs) for network service providers on the public network. In this way, if one of the communication links fails, then traffic may be able to pass over the other link. By connecting the gateways to different POPs, this approach also provides redundancy in case a POP fails, or a particular network service provider's network infrastructure (e.g., backbone network) fails. Multiple gateways also provide a basis for balancing communication load, and to reacting to performance degradation, such as congestion, that does not necessarily result in complete failure of a communication path.

Internet Protocol (IP) based networks can make use of dynamic routing protocols to maintain routing information at routing hosts and devices (routers) in the network in order to route IP packets through the network to their destination based on destination address information in packet headers. Two standard protocols for dynamically maintaining routing information are RIP (see RFC 1058) and OSPF (see RFC 2328). One characteristic of these protocols is that if a router determines that a neighboring router is inaccessible, for example because is does not receive responses to a number of requests for routing information from that neighbor, that router updates its routing tables and propagates an indication that the neighbor is inaccessible to its other neighboring routers.

In some virtual private networks, routing information passes between devices over the tunnels such that the tunnels act as virtual links and the devices at each end of the tunnels act as routing devices that are coupled by the virtual links. In this way devices at different sites can dynamically update routing information for paths that use those virtual links.

SUMMARY

One approach to providing fault tolerance in a VPN network is to link computers using redundant virtual links. When communication through one of the virtual links is interrupted, active communication sessions are re-routed to one of the redundant virtual links. In an IP-based virtual network, this re-routing can be performed by passing routing information through the virtual links of the VPN according to the OSPF, RIP, or other dynamic routing protocols. As the routing information is updated, IP packets follow the new route through the redundant virtual link.

Transport layer communication sessions are typically configured to have timeout periods such that if communication is interrupted for more than that timeout period, the transport session is terminated. For example, a TCP session may have a timeout period in the order of 10 seconds. Therefore, if routing information is not dynamically updated in the VPN quickly enough, the transport session may not be rerouted to a redundant virtual link before its timeout period and therefore may be terminated. It is desirable to avoid such interruption of the transport layer sessions.

In general, the invention features an approach to rapid failover of a communication path between computers that are linked by redundant virtual links in a virtual private network (VPN). The approach features detection of communication link and device failures through an active monitoring approach and rerouting of communication through a redundant link when a failure is detected.

In a one aspect, in general, the invention features a method for providing remote access to a server system over a data network. Multiple communication paths through the data network are maintained between each of one or more client systems and the server system. Each path is associated with one of a number of gateway devices that are coupled between the data network and the server system. For each of the client systems, the paths between that client system and the server system are associated with different of the gateway devices. Communication is routed between a first of the client systems and the server system over a first of the communication paths passing through a first of the gateway devices. In the event of a communication failure associated with the first gateway device, the communication is re-routed to a second of the communication paths though a second of the gateway devices.

The method can include one or more of the following features:

The communication paths are through geographically distributed of the gateway devices, and these geographically distributed gateway devices are coupled through a trusted data network.

A separate virtual communication link is maintained between each of the client systems and multiple of the gateway devices.

At least some of the client systems include a client computer coupled to an access device. The virtual links are maintained between the access devices and the gateway devices.

A communication tunnel is maintained between the client system and the gateway device. The tunnel can use the PPTP, L2TP, IPSec, or other tunneling approach.

Network layer communication passes through the tunnel in a Point-to-Point Protocol (PPP) session.

Routing communication between the client system and the server system includes transmitting data from the client system over the data network to a first network addressed of the first gateway device.

Re-routing the communication includes transmitting data from the client system over the data network to a network address of the second gateway device, which is different than the address of the first gateway device.

The method further includes monitoring communication associated with the first gateway device.

Communication characteristics between the first gateway device and one or more devices of the server system are monitored.

The monitoring includes polling the devices from the first gateway device and detecting responses at the first gateway device from those devices.

Polling the devices includes transmitting ICMP echo requests.

Communication characteristics between the first gateway device and the data network are monitored.

A device coupled between the first gateway device and the data network is monitored.

Communication characteristics between the first gateway device and a network Point of Presence (POP) of the data network are monitored.

Communication characteristics between the first gateway device and one or more devices accessible over the data network are monitored.

Communication characteristics between the gateway device and the client system are monitored.

Heartbeat messages from the first gateway device are transmitted to devices and responses from the devices are detected at the first gateway device.

Heartbeat messages include ICMP echo requests, or LCP echo requests.

Re-routing the communication includes terminating the communication paths passing through the first gateway device.

Re-routing the communication includes updating routing data to indicate the second gateway device provides a path between the first client system and the server system.

Updating the routing data includes passing routing data from the second gateway device to the first client system.

Updating the routing data includes passing routing data from the second gateway device to one or more devices, such as routers and host computers, of the server system.

Aspects of the invention can include one or more of the following advantages:

Failover to a redundant link can be rapid enough to avoid timeout of transport layer communication sessions between the computers. For example, a TCP/IP communication session may have a timeout of less than 10 seconds, and the invention provides a mechanism by which communication is reestablished within this timeout period. In this way, ongoing communication, such as a lengthy TCP-based data transfer session does not have to be restarted.

Active monitoring of particularly important communication paths allows IP routing information to be updated quickly in the event of a failure and this updating may be achieved more quickly than may be possible using standard dynamic routing protocols.

Active monitoring using small heartbeat messages may load the communication links less than using standard "hello" messages for dynamic routing update protocols.

Redundant gateway devices do not have to be co-located or tightly coordinated to protect against failures of the gateway devices. For example, for increased reliability, the gateway devices can be geographically separated while still allowing a rapid failover in case of failure of one of the gateway devices or a failure of another device or communication link on the path through the gateway device.

The approach can be combined with redundant device and link backup approaches that allow a backup device or link to take the role of a primary device or link on a failure. If both a primary and backup of such a device fail, the invention provides a mechanism for further failure protection without interrupting communication sessions.

The approach can be combined with control of a variety of types of devices, such as load balancing devices, to route communication through backup gateways.

Other features and advantages of the invention are apparent from the following description, and from the claims.

DESCRIPTION OF DRAWINGS

FIG. 5A is a diagram that illustrates a gateway detecting a heartbeat failure to an access device;

FIG. 5B is a diagram that illustrates a gateway detecting a heartbeat failure to a server;

FIG. 5C is a diagram that illustrates an access device detecting a heartbeat failure to a gateway;

DESCRIPTION

Figure 1:
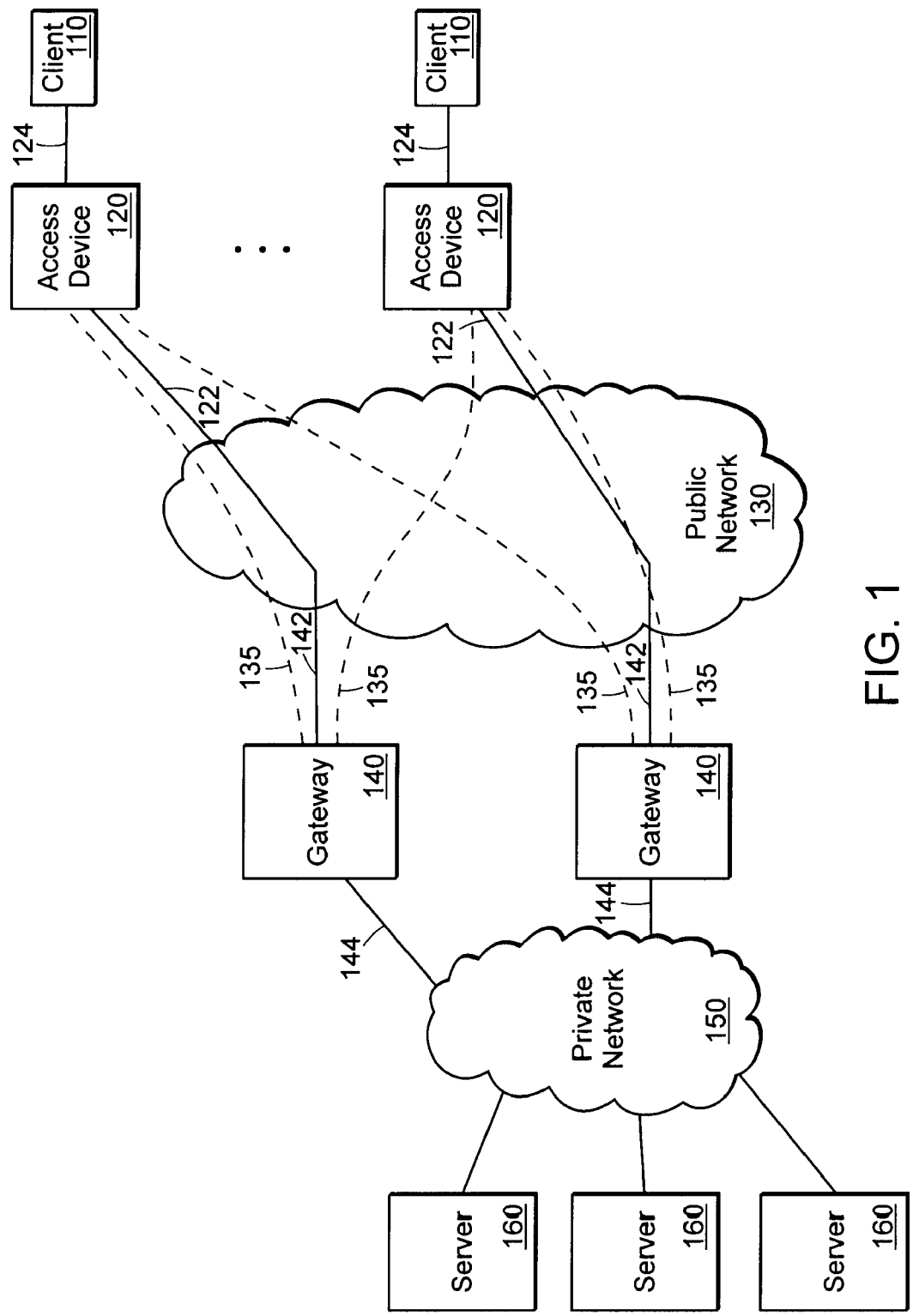
FIG. 1 is a network diagram that illustrates a number of client computers coupled to a number of server computers using a virtual private network and redundant gateways.

Referring to FIG. 1, a number of clients 110 communicate with servers 160 over a public network 130, such as the Internet. Clients 110 and servers 160 are typically general-purpose computers. Only two clients 110 are illustrated in FIG. 1; in general, the clients 110 can number in the hundreds or more. Also, three servers 160 are illustrated in FIG. 1; in general, fewer or a greater number of servers are used in various examples of this approach. Public network 130 is a packet network that uses the Internet Protocol (IP) for routing packets through the network. Communication between clients 110 and servers 160 also passes over private network 150. Private network 150 is also a packet network that in this embodiment also uses IP for routing packets. In various examples of this approach, private network 150 may be a single Ethernet LAN or may include a routed network that includes a number of routing hosts or devices on the paths from clients 110 to servers 160. Such a routed network may be geographically distributed.

Each client 110 is configured to communicate through two or more gateways 140, each of which links public network 130 and private network 150. Two representative gateways 140 are shown in FIG. 1. Each gateway 140 has a separate communication link 142 to public network 130 to provide redundancy. For example, each gateway 140 may have a separate dedicated communication link, such as a leased T1 link, that terminates at a separate point-of-presence (POP) of public network 130. Each gateway 140 also has a separate communication link 144 that couples the gateway to private network 150.

Communication between clients 110 and servers 160 passes through public network 130 over virtual links of a virtual private network (VPN). At the site of each client 110, an access device 120 is coupled on the communication path between client 110 and public network 130. Each access device 120 establishes VPN tunnels 135 to two or more gateways 140. In this embodiment, each tunnel makes use of the IPSec protocol to transport and encrypt packets passing between access devices 120 and gateways 140. Each IPSec tunnel carries a PPP (Point-to-Point Protocol) data stream that is transported using a GRE (Generic Routing and Encapsulation) protocol. In this way, each tunnel provides a virtual link between the access device 120 and the gateway 140 at its endpoints. In alternative embodiments, different tunneling protocols, such as native IPSec tunneling, or L2TP or PPTP based tunnels are used to link the access devices and the gateways, and combinations of different tunneling protocols are used to link different clients to the servers.

Each access device 120 is preconfigured with the addresses on public network 130 of two or more gateways 140. For example, the IP host addresses of the gateways are stored in non-volatile memory of the access device. Access device 120 establishes tunnels 135 to those preconfigured gateways when it initially begins to establish communication with servers 160. Access device 120 treats one gateway is treated as a primary gateway while it treats the others as backups. After each tunnel 135 is established, gateway 140 sends updated routing information over private network 150 that identifies that gateway as a providing a route to the client 110 that is accessible over the tunnel. In this embodiment, the routing protocol used by gateways 140 on private network 150 is configurable from a set of protocols that include the OSPF (Open Shortest Path First) protocol and RIP (Router Interchange Protocol).

Client 110 uses its access device 120 as its default IP gateway. IP packets therefore first pass from client 110 to its access device 120. Based on that access device's current primary gateway 140, the access device routes packets addressed to server systems 160 over the tunnel 135 corresponding to its primary gateway 140. The receiving gateway 140 then routes the packet to the destination server 160. IP communication from client 110 to server 160 may use a transport protocol that acknowledges packets, such as TCP, and therefore server 160 sends acknowledgement packets addressed to client 110. These acknowledgments are routed back to client 110 according to routing information at the originating server 160 and at routing devices in private network 150.

Figure 2:
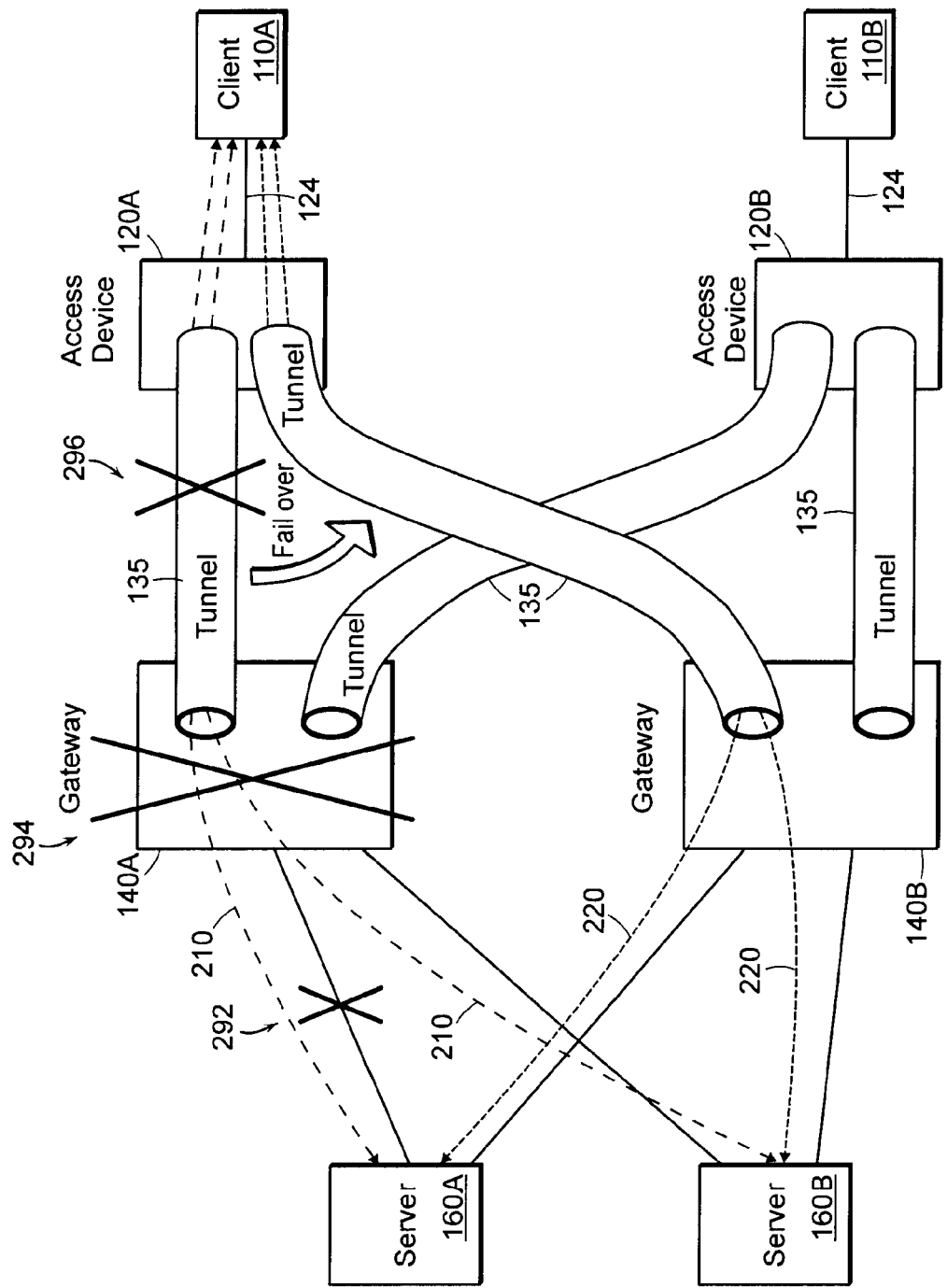
FIG. 2 is a diagram that illustrates possible points of failure in a redundant VPN arrangement.

Referring to FIG. 2, failures can occur at several points along the communication paths between clients 110 and servers 160. First, the communication path between a primary gateway 140A and a server 160A may fail (292). For example, a communication link or a device such as a router or hub in private network 150 may fail or become overly congested. Note that depending on the redundancy built into private network 150, a communication path from a backup gateway 140B to server 160A may still be available. Another point of failure is primary gateway 140A itself (294). Yet another point of failure is tunnel 135 linking primary gateway 140A and access device 120A (296). For example, the communication link between gateway 140A and public network 130 may fail, the POP that couples that communication link to the public network may fail, or a portion of public network 130 that is associated with that POP (e.g., a network service provider's network backbone) may fail.

The general approach to handling each of these types of failures is to rapidly reroute communication from the tunnel 135 linking access device 120A and primary gateway 140A to the tunnel 135 linking access device 120A and backup gateway 140B. For example, if client 110A had active transport layer sessions with both server 160A and 160B (illustrated as paths 210), then after the failover, these transport sessions follow paths through backup gateway 140B (illustrated as paths 220).

Figure 3:
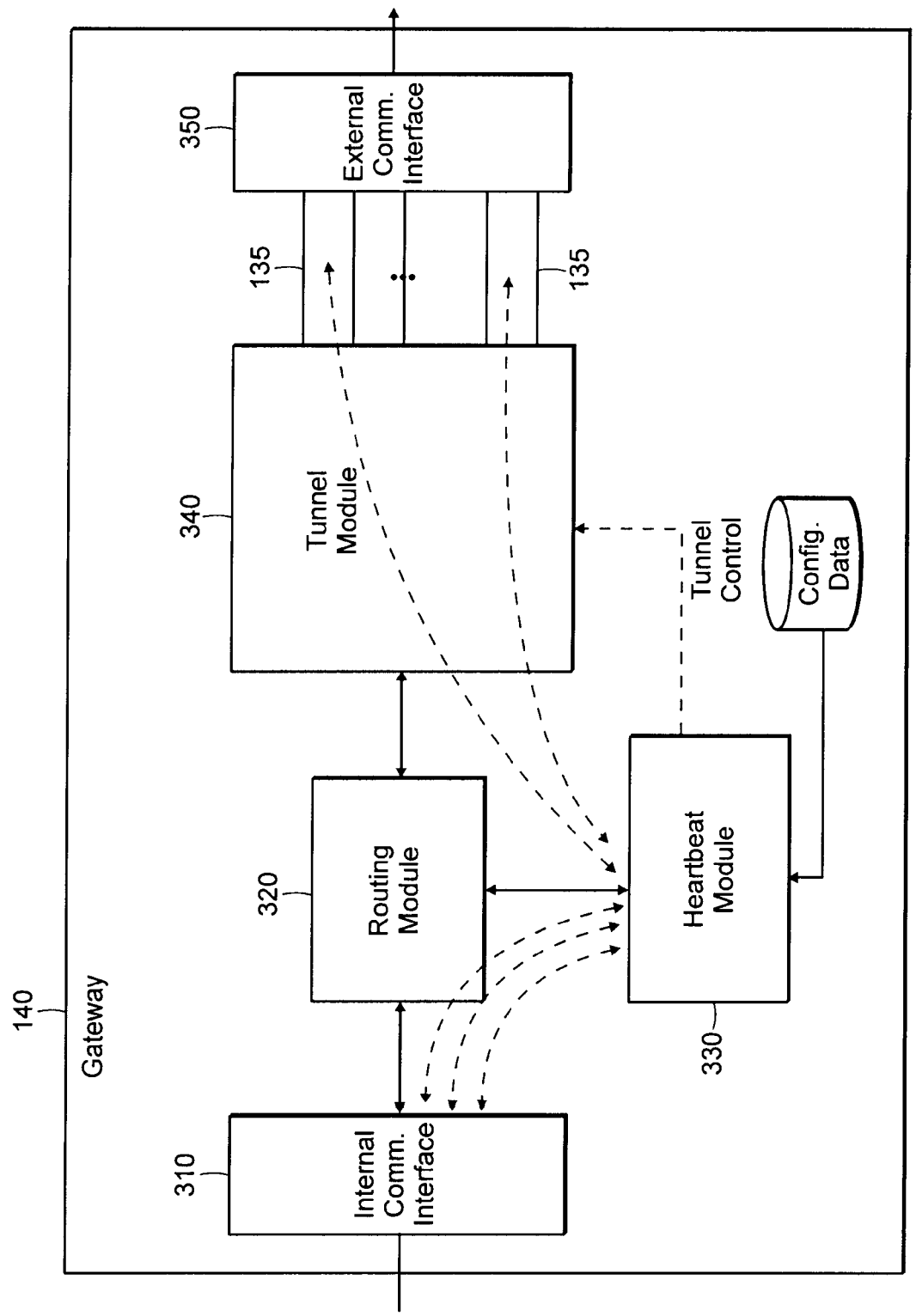
FIG. 3 is a logical block diagram of a gateway.

Referring to FIG. 3, gateway 140 includes a number of logical components. In various embodiments, these components are implemented in software, in hardware, of using a combination of hardware and software. An internal interface 310 provides a communication path to private network 150 while an external interface 350 provides a communication path to public network 130. A tunnel module 340 serves as the endpoint for tunnels 135, each passing through external interface 350 to a different access device 120. Each tunnel 135 is associated with a different IP address on the virtual private network. A routing module 320 routes IP packets between private network 150 and tunnels 135. Routing module 320 passes and receives routing information over tunnels 135 using a routing protocol such as RIP. In this way, after a tunnel 135 is set up, routing module 320 receives routing information over the tunnel that identifies the IP address of client 110 that is accessible over that tunnel. When routing module 320 receives an IP packet addressed to a particular client it passes the packet to the appropriate tunnel 135. Routing module 320 propagates routing information it receives from tunnels 135 to private network 150 and routing information it receives from private network 150 to tunnels 135. In this way, devices on private network 150, such as server 160, can make use of the gateway 140 to reach particular clients 110.

Gateway 140 also includes a heartbeat module 330 that communicates with devices on private network 150 and with access devices 120 over tunnels 135. Heartbeat module 330 is configurable. Configuration data 335 includes an identification of the particular devices on private network 150 with which heartbeat module should attempt to maintain communication. In addition, configuration data 335 identifies with which of these devices an ability to communicate is critical. In general, heartbeat module 330 sends periodic heartbeat messages to the identified devices. The period of the heartbeat messages is also configurable, typically in the range of 2.0 to 4.0 seconds. The period is chosen to be long enough to not unduly load the network and is chosen short enough such that a failure can be detected and acted upon quickly. During normal operation, the devices that receive the heartbeat messages immediately respond to each heartbeat message. Configuration data 335 also identifies how many sequential heartbeat messages to a particular device must be unanswered to declare a failure of communication with that device. Typically, this number is in the range of 2-4 messages. Therefore, a period of 3.5 seconds and declaration of a failure after 2 unanswered heartbeats yields detection within approximately 7.0 seconds of a failure, at which point failover is initiated.

Configuration data 335 also identifies whether devices on private network 150 are "critical." If any critical device fails to respond to a heartbeat message from gateway 140, the entire gateway is disabled and all tunnels 135 from that gateway are shut down and no new tunnels are accepted until the critical device again starts responding to heartbeat messages. When gateway 140 shuts down its tunnels, routing module 320 sends updated routing information to devices on private network 150, for example using the OSPF protocol, to identify the fact that it is no longer a valid gateway to the access devices 120 and clients 110 that it previously served.

Other devices on private network 150 are not marked as critical, and gateway 140 is shut down only after all the non-critical devices concurrently fail to respond to heartbeat messages. Configuration data 335 also identifies the characteristics of heartbeat messages sent to access devices 120 over tunnels 135. If heartbeats through a particular tunnel 135 fail to be answered the configured number of sequential times, that tunnel is terminated, but the gateway otherwise continues to perform its functions. Routing module 320 sends updated routing information to devices on private network 150 to identify the fact that it is no longer a valid gateway to the access device 120 and client 110 that it previously served through the terminated tunnel.

Each access device 120 has a similar logical arrangement as that shown for gateway 140 in FIG. 3. A heartbeat module in an access device sends heartbeats to the gateways 140 to which it has tunnels. If the primary gateways fails to respond, the access device terminates the tunnel and the router module immediately starts passing packets from client 110 over a tunnel 135 to a backup gateway 135. The tunnel module then begins and continues to try to reestablish a tunnel to the primary gateway. The router module at the access device sends a request to the router module at the backup gateway to send updated routing information rather than waiting to periodic routing updates it would send as part of normal operation of the route update protocol (e.g., RIP).

Figure 4:
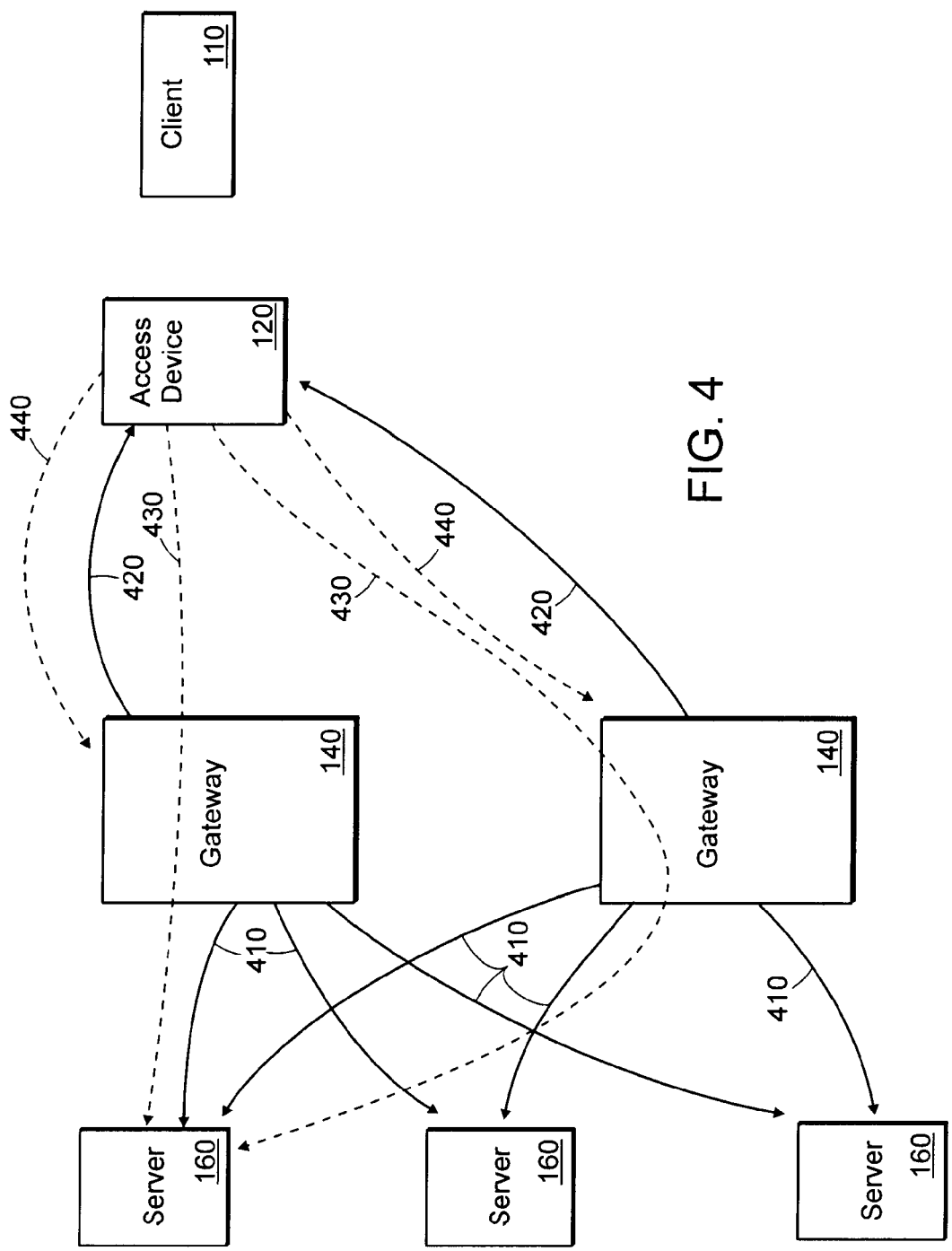
FIG. 4 is a diagram that illustrates the use of heartbeat messages in a network.

Referring to FIG. 4, the paths for various heartbeat messages (410, 420) are shown in an example with one client 110 and three servers 160 served by two gateways 140. (Each arrow represents a path of heartbeat messages; replies to the heartbeat messages flow in the reverse directions). Each gateway 140 independently sends periodic heartbeat messages 410 to each server 160. In this embodiment, heartbeat messages 410 that are sent from gateway 140 to servers 160 use the PING protocol. Note that in general, private network 150 is a routed network, and therefore each of these heartbeat messages may pass through one or more devices, such as routers, load managers or other routing devices, on the path between the gateway and the server. Therefore, a failure of any of the devices along the path will prevent the heartbeat from being answered.

Each gateway 140 also sends heartbeat messages 420 to each access device 120 to which it has a tunnel connected. Heartbeat messages 420 do not necessarily use the same protocol as do heartbeat messages 410. The protocol is configurable. For example, LCP (Link Control Protocol) Echo Requests are used to implement heartbeats 420.

Access device 120 can also be configured to send heartbeat messages (440) to each of gateways 140. Access devices 120 can also be configured to send heartbeat messages (430) to particular devices (e.g., servers 160) through each gateway 140, thereby directly monitoring critical communication through each of the gateways.

Figure 5A:
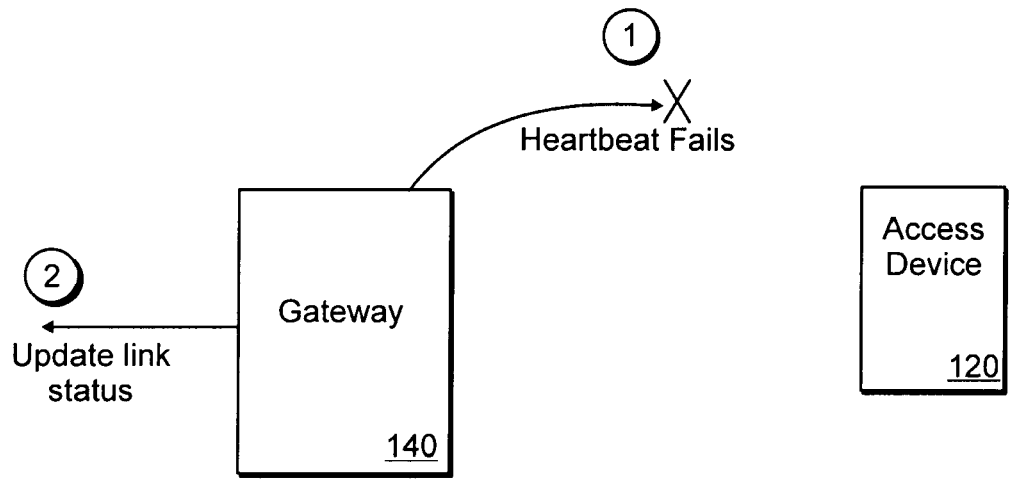
FIGS. 5A-5C are diagrams that illustrate sequences of events when a device or communication link fails.
Figure 5B:
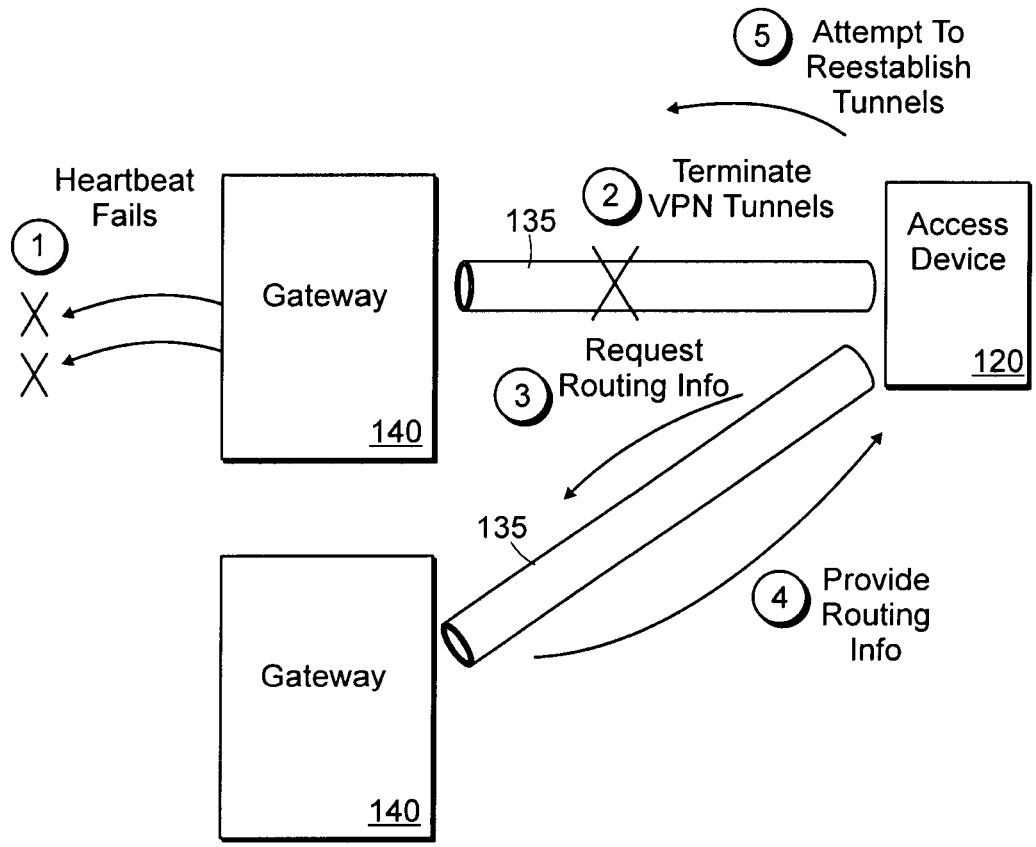
Figure 5C:
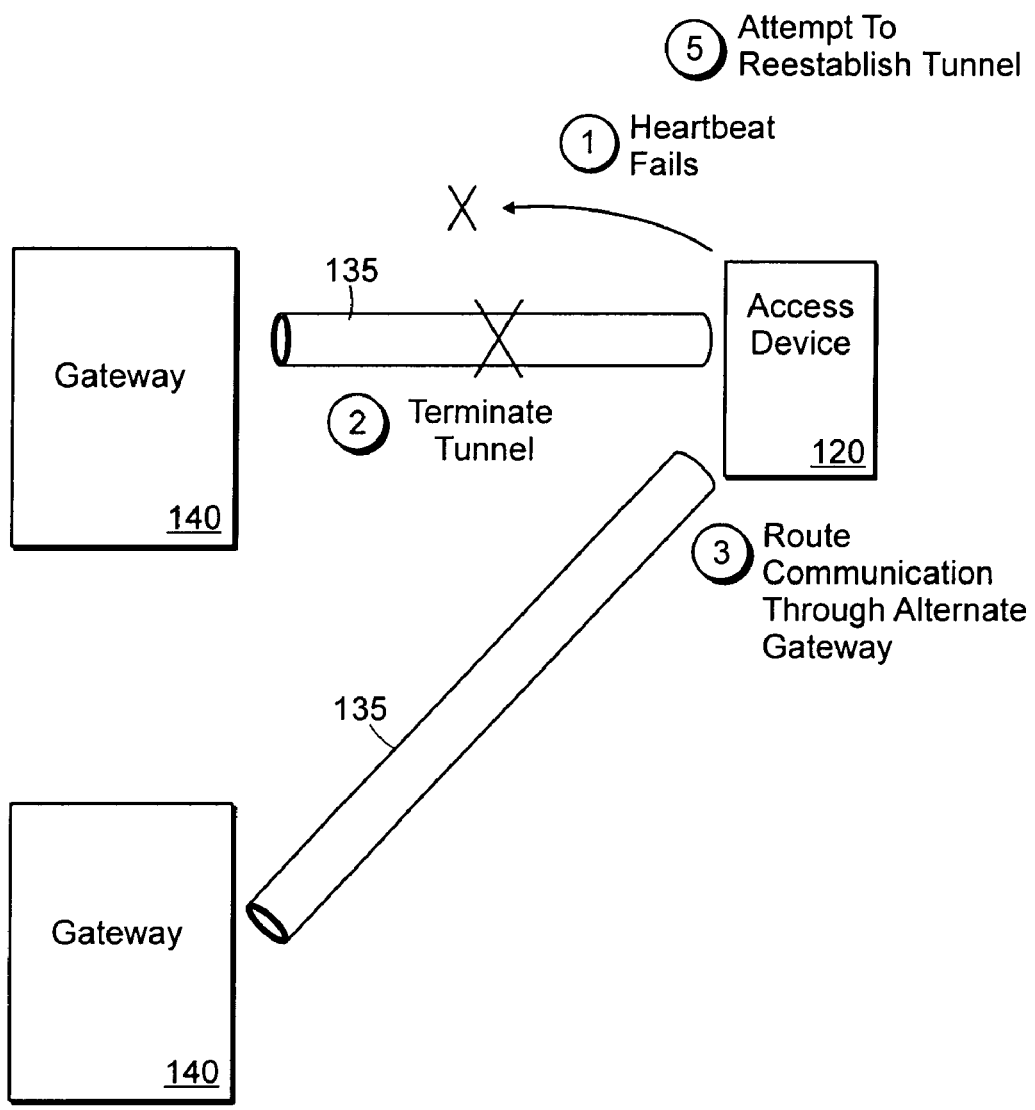

Referring to FIGS. 5A-5C, different types of failures result in different sequences of operations at gateway 140 and access device 120. FIG. 5A illustrates a failure of a heartbeat to an access device. The sequence of events is as follows:

1. Gateway 140 detects a heartbeat failure to an access device 120.
2. The router module of the gateway triggers a routing update to neighboring routing devices on private network 150, using a configurable routing protocol that is appropriate for private network 150 such as OSPF or RIP, which identifies that access device 120 is no longer accessible. This update propagates according to the routing protocol to intermediate routers in private network 150 and to servers 160.
3. Gateway 140 terminates tunnel 135 to access device 120 and then waits to accept a request from the access device to reestablish the tunnel.

Referring to FIG. 5B, a heartbeat failure to a critical server, or to all the non-critical servers, results in the following sequence of events:

1. Gateway 140 detects the heartbeat failure from the server and informs the access devices 120 coupled to it through tunnels 135 that it will be terminating the tunnels to them.
2. The gateway then terminates all the tunnels to the access devices and propagates route update information to routing devices on private network 150 to indicate that it no longer provides a route to the corresponding access devices and clients.
3. At each access device 120 that has had the tunnel to its primary gateway terminated, the router module begins rerouting traffic to the backup gateway. The access device also request updated routing information from the backup gateway.
4. The backup gateway sends the updated routing information in response to the request from the access device.
5. After any tunnel to an access device is terminated, the access device begins to try to reestablish the tunnel. However, the gateway that terminated the tunnel does not accept the requests to reestablish the tunnels until it is one again successfully receiving replies to the heartbeat messages it is sending to servers 160.

If access device 120 is configured to initiate heartbeat messages 430 or 440, the access device itself initiates shutdown of a tunnel when a heartbeat message is not answered. Referring to FIG. 5C, a heartbeat failure from an access device 120 to a gateway 140 results in the following sequence of events.

1. Access device 120 detects a heartbeat failure.
2. The access device terminates the tunnel if it has not already been terminated (for example by the gateway under the scenario shown in FIG. 5B).
3. 4. and 5. are the same from the access device's point of view as when the gateway initiated the termination of the tunnel.

In various examples of this approach, private network 150 can include a variety of different types of routing "fabrics." For example, private network 150 can be configured to be statically routed or to use a dynamic routing protocol such as OSPF.

Figure 6:
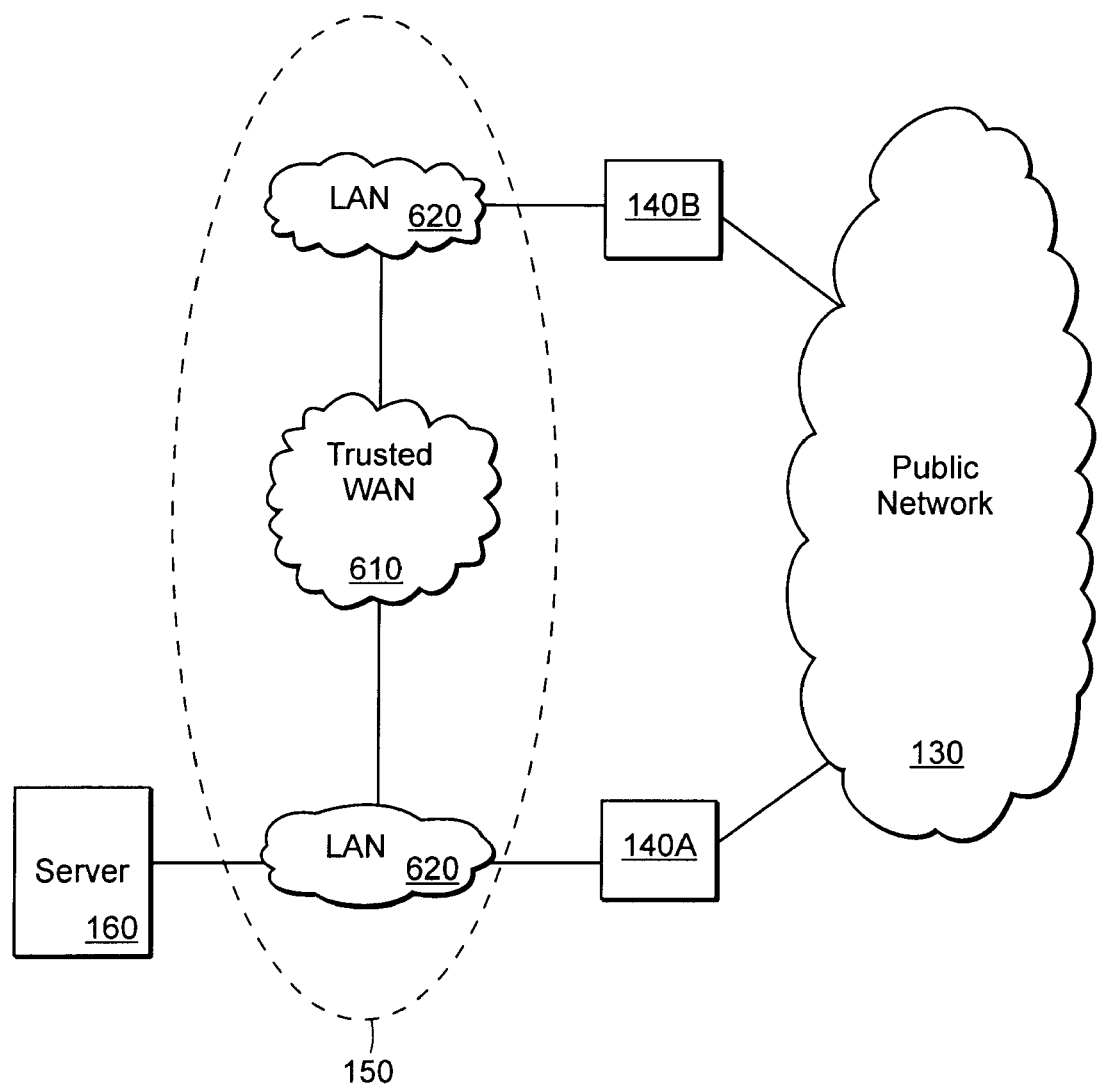
FIG. 6 is a diagram that illustrates geographically distributed gateways.

Referring to FIG. 6, gateways 140 can be geographically separated, for example, being located in different cities. At the site of each gateway 140, a local area network 620 provides a link between the gateway and a trusted wide area network (WAN) 610. Together, LANs 620 and trusted WAN 610 form a private network such that if communication is re-routed from gateway 140A to gateway 140B, communication passes over trusted WAN 610 to reach server 160.

Figure 7:
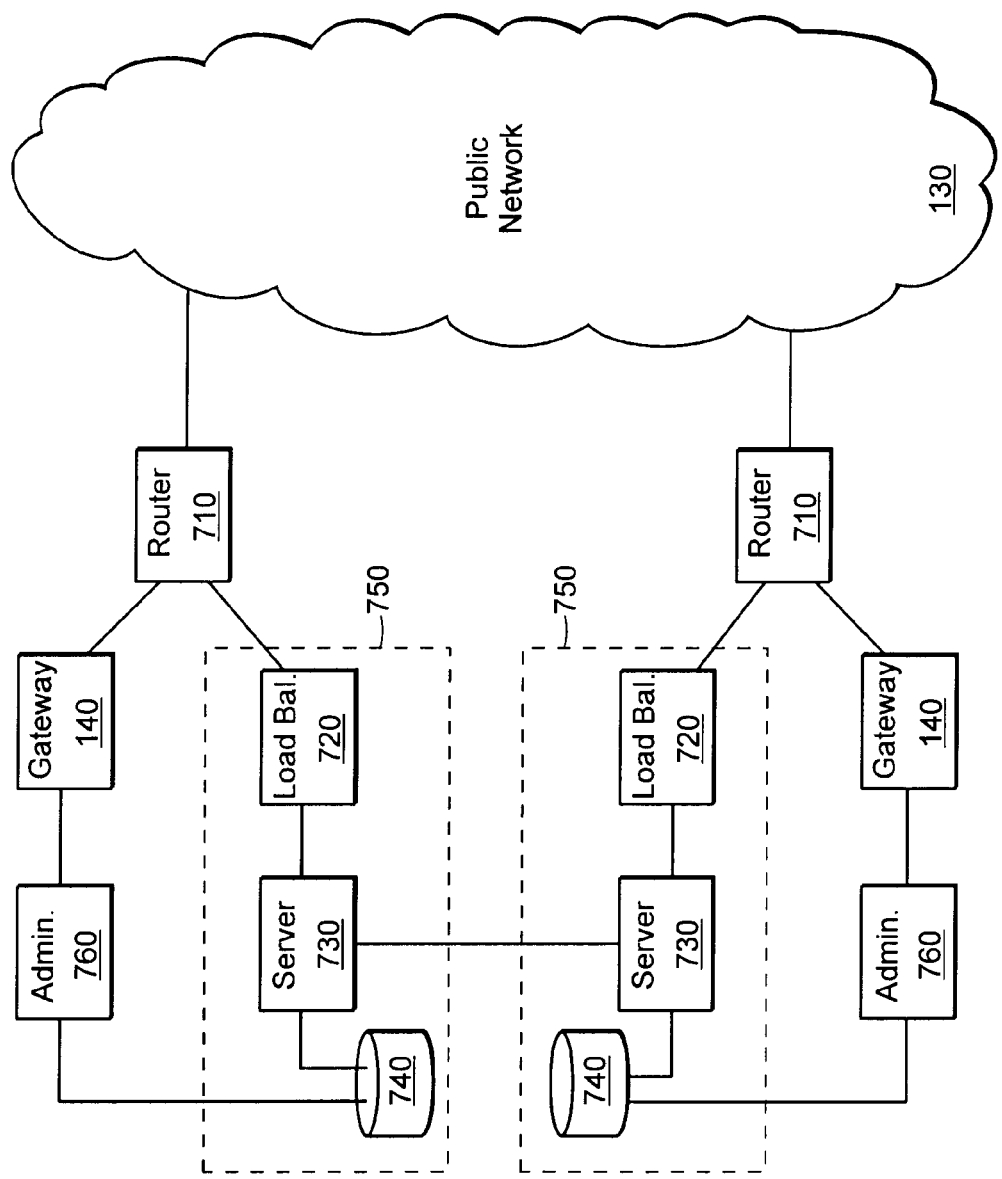
FIG. 7 is a diagram that illustrates use of gateways in a redundant server system.

Referring to FIG. 7, an application of gateways 140 is in a fault tolerant server system in which routers 710 each provide a path to a redundant server system 750. For example, each server system 750 may be located in a different city. Each of the server systems includes a load balancer 720 and a server 730, which uses a data store 740. Servers 730 cooperate to keep the data stores consistent. A gateway 140 is collocated with each server system and is coupled to router 710 at that system to provide an administration interface to maintain the servers and the data stores. Administrators establish secure tunnel connections from public network 130 through the gateways to administration computers 760, which execute applications that are used to maintain the servers and data stores. In the event of a failure of either of the sites, administrators sessions over tunnels to the gateway at that site are failed over to the gateway at the other site.

Figure 8:
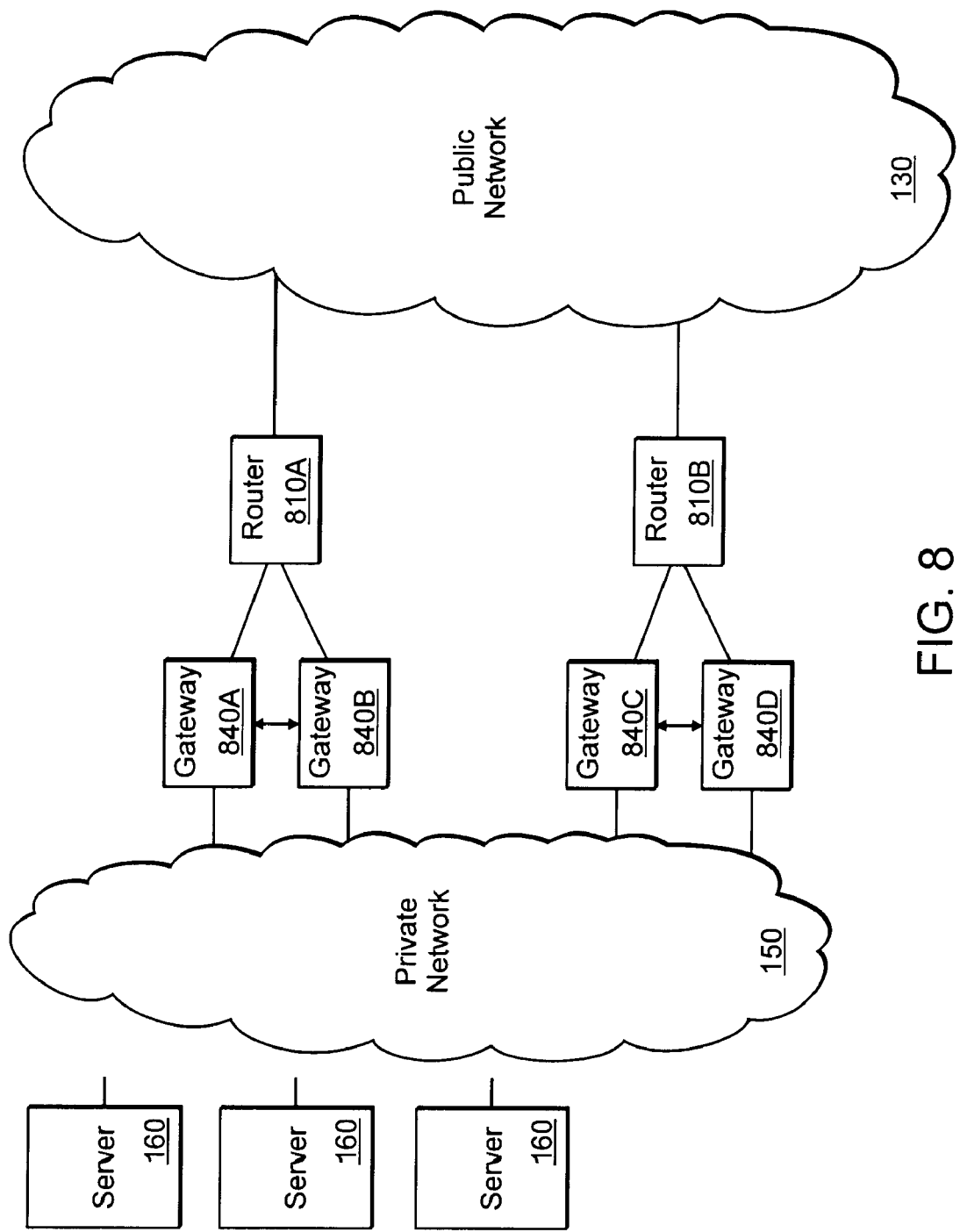
FIG. 8 is a diagram that illustrates use of fault-tolerant gateways.

Referring to FIG. 8, the type of redundancy described above can be combined with hardware failover to a standby gateway in case a primary gateway fails. In FIG. 8, at gateway 840A is a primary gateway that provides a link between router 810A and private network 150. While gateway 840A is functioning, gateway 840B is in a backup role, for example remaining idle or alternatively mirroring operations of primary gateway 840A. In the event of a failure of primary gateway 840A, backup gateway 840B assumes the primary role, and assumes the external addresses of the failed gateway. By assuming the same addresses, routing information in the private network and at the clients does not have to change. Therefore, 840A and 840B together perform the function of a single gateway 140, but with the higher reliability afforded by using a hardware redundancy. Similarly, gateways 840C and 840D together serve the function of a single gateway 140. In the event of other forms of failure, for example failure of router 810A, communication paths are re-routed from gateway 840A to gateway 840C according to the approach described with reference to gateways 140. Therefore, use of redundant tunnels can be combined with redundant approaches for the design of each of the gateways themselves to provide even greater reliability. In yet another configuration, each gateway 140 (or a pair of redundant gateways 840A-B) is coupled to separate routers that are arranged in a primary-backup arrangement using the VRRP protocol (see RFC 2338).

In alternative embodiments, gateways 140 pass information regarding accessibility to various clients 110 using approaches other than using standard dynamic routing protocols. For example, each gateway 140 may communicate directly with a load management device to indicate with clients are accessible using a special purpose communication protocol.

In other embodiments, or in combination with the approaches described above, devices on private network 150 can poll gateways 140 to determine their status. For example, a load balancing device can poll the gateways to determine which access devices 120 are accessible through the gateways.

In alternative embodiments, the primary gateway 140 advertises to devices on private network 150 a lower routing cost for routing traffic to client 110 than does the backup gateway 140. In this way, traffic flowing from private network 150 to client 110 is preferentially directed through the primary gateway 110. Since the primary gateway 140 has advertised a lower cost to route packets to client 110, acknowledgement packets will typically pass back to client 110 through the primary gateway 140 for that client.

It is to be understood that the foregoing description is intended to illustrate and not to limit the scope of the invention. Other embodiments are within the scope of the following claims.

What is claimed is:

1. A method for providing remote access to a server system over a data network comprising:
    maintaining a plurality of communication paths through the data network between each of one or more client systems and the server system,
        each path being associated with one of a plurality of gateway devices coupled between the data network and the server system, wherein each path is maintained as an active transport layer session;
        for each of the client systems, the paths between said client system and the server system being associated with different of the gateway devices;
    routing communication between a first of the client systems and the server system over a first of the communication paths passing through a first of the gateway devices;
    monitoring communications associated with the first gateway device; and
    re-routing the communication between the first client system and the server system to a second of the communication paths through a second of the gateway devices, before a transport layer timeout, in the event of a communication failure associated with the first gateway device.

2. The method of claim 1 wherein maintaining the communication paths includes maintaining paths through geographically distributed of the gateway devices, and coupling said geographically distributed gateway devices through a trusted data network.

3. The method of claim 1 wherein maintaining the communication paths includes maintaining a separate virtual communication link between each of the client systems and multiple of the gateway devices.

4. The method of claim 3 wherein at least some of the client systems include a client computer coupled to an access device, and wherein maintaining a virtual link between said client systems and the gateway devices includes maintaining virtual links between the access devices and the gateway devices.

5. The method of claim 3 wherein maintaining each of the virtual links includes maintaining a communication tunnel between the client system and the gateway device coupled by said link.

6. The method of claim 5 wherein maintaining the communication tunnels includes maintaining a PPTP tunnel.

7. The method of claim 5 wherein maintaining the communication tunnels includes maintaining a L2TP tunnel.

8. The method of claim 5 wherein maintaining the communication tunnels includes maintaining a IPSec tunnel.

9. The method of claim 8 wherein maintaining the IPSec tunnel includes passing network layer communication through said tunnel.

10. The method of claim 9 wherein passing network layer communication through the tunnel includes passing network layer communication in a Point-to-Point Protocol (PPP) session and passing the PPP session through the tunnel.

11. The method of claim 1 wherein routing communication between the client system and the server system includes transmitting data from the client system over the data network to a first network addressed of the first gateway device.

12. The method of claim 11 wherein re-routing the communication includes transmitting data from the client system over the data network to a network address of the second gateway device, said address of the second gateway address being different than the address of the first gateway device.

13. The method of claim 1 wherein monitoring communication associated with the first gateway device includes monitoring communication characteristics between the first gateway device and one or more devices of the server system.

14. The method of claim 13 wherein monitoring communication characteristics between the first gateway device and the one or more devices includes polling said devices from the first gateway device and detecting responses at the first gateway device from said devices.

15. The method of claim 14 wherein polling the devices includes transmitting ICMP echo requests.

16. The method of claim 1 wherein monitoring communication associated with the first gateway device includes monitoring communication characteristics between the first gateway device and the data network.

17. The method of claim 16 wherein monitoring communication characteristics between the first gateway device and the data network includes monitoring a device coupled between the first gateway device and the data network.

18. The method of claim 16 wherein monitoring communication characteristics between the first gateway device and the data network includes monitoring communication characteristics between the first gateway device and a network Point of Presence (POP) of the data network.

19. The method of claim 1 wherein monitoring communication associated with the first gateway device includes monitoring communication characteristics between the first gateway device and one or more devices accessible over the data network.

20. The method of claim 19 wherein monitoring communication characteristics between the first gateway device and one or more devices accessible over the data network includes monitoring communication characteristics between the gateway device and the client system.

21. The method of claim 19 wherein monitoring communication characteristics between the first gateway device and the one or more devices includes transmitting heartbeat messages from the first gateway device to said devices and detecting responses at the first gateway device from said devices.

22. The method of claim 21 wherein transmitting heartbeat messages includes transmitting ICMP echo requests.

23. The method of claim 21 wherein transmitting heartbeat messages includes transmitting LCP echo requests.

24. The method of claim 1 wherein re-routing the communication includes terminating the communication paths passing through the first gateway device.

25. The method of claim 1 wherein re-routing the communication includes updating routing data to indicate the second gateway device provides a path between the first client system and the server system.

26. The method of claim 25 wherein updating the routing data includes passing routing data from the second gateway device to the first client system.

27. The method of claim 25 wherein updating the routing data includes passing routing data from the second gateway device to one or more devices of the server system.

28. The method of claim 27 wherein passing the routing data to the one or more devices of the server system includes passing said data to routers of said system.

29. The method of claim 27 wherein passing the routing data to the one or more devices of the server system includes passing said data to host computers of said system.

30. A communication system comprising:
a plurality of gateway devices, each programmed to maintain a communication path between each of one or more client systems and the server system;
the gateway devices being programmed to route communication between a first of the client systems and the server system over a first of the communication paths passing through a first of the gateway devices, communication associated with the first gateway device being monitored, and to re-route the communication between the first client system and the server to a second of the communication paths via an active transport layer session through a second of the gateway devices, before a transport layer timeout, in the event of a communication failure associated with the first gateway device.

* * * * *